US011212802B2

(12) United States Patent
Yerramalli

(10) Patent No.: US 11,212,802 B2
(45) Date of Patent: Dec. 28, 2021

(54) COEXISTENCE OF INTERLEAVED AND CONTIGUOUS UPLINK TRANSMISSIONS

(71) Applicant: QUALCOMM Incorporated, San Diego, CA (US)

(72) Inventor: Srinivas Yerramalli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 98 days.

(21) Appl. No.: 16/698,378

(22) Filed: Nov. 27, 2019

(65) Prior Publication Data

US 2020/0100251 A1    Mar. 26, 2020

Related U.S. Application Data

(62) Division of application No. 15/724,951, filed on Oct. 4, 2017, now Pat. No. 10,506,596.

(Continued)

(51) Int. Cl.
*H04W 72/04* (2009.01)
*H04W 16/14* (2009.01)
*H04W 74/08* (2009.01)

(52) U.S. Cl.
CPC ....... *H04W 72/0453* (2013.01); *H04W 16/14* (2013.01); *H04W 72/048* (2013.01); *H04W 74/0808* (2013.01); *H04W 74/0816* (2013.01)

(58) Field of Classification Search
CPC ............. H04W 72/0453; H04W 16/14; H04W 72/048; H04W 74/0808
See application file for complete search history.

(56) References Cited

U.S. PATENT DOCUMENTS

| 7,782,900 B2 | 8/2010 | Bachl et al. |
| 2003/0086393 A1 | 5/2003 | Vasudevan et al. |

(Continued)

FOREIGN PATENT DOCUMENTS

WO    WO-2011134351 A1    11/2011

OTHER PUBLICATIONS

Huawei et al. "PUSCH Resource Allocation", 3GPP Draft; R1-166123, 3rd Generation Partnership Project (3GPP), Mobile Competence Centre; 650, Route Des Lucioles; F-06921 Sophia-Anti Polis Cedex; France, vol. Ran WG1, No. Gothenburg, Sweden; Aug. 21, 2016, XP051140070, Retrieved from the Internet: URL:http://www.3gpp.org/ftp/Meetings_3GPP_SYNC/RAN1/Docs/ [retrieved on Aug. 21, 2016], 2 pages.

(Continued)

*Primary Examiner* — Mohammad S Anwar
(74) *Attorney, Agent, or Firm* — Holland & Hart LLP/Qualcomm

(57) ABSTRACT

A wireless communication system may allocate uplink resources to configure coexisting interleaved and contiguous uplink transmissions. Operation using different waveform types may address bandwidth occupancy requirements, power spectral density (PSD) limitations, etc. A carrier bandwidth may be split into regions allocated for interlaced resource allocations and contiguous resource allocations for frequency division multiplexing (FDM) based coexistence. To achieve coexistence of such waveform types, a base station may indicate a waveform type, a transmission carrier bandwidth or channel, and a resource block allocation (e.g., an interlace pattern, certain ranges within the carrier bandwidth, etc.) for uplink transmissions. In some cases, channel contention procedures (e.g., Listen Before Talk (LBT)) and power constraints (e.g., power spectral density (PSD) limitations) may be based on the waveform type associated with (Continued)

the uplink transmission. A base station may allocate frequency resources of an uplink TTI to multiple UEs, which may operate according to different waveform types.

20 Claims, 18 Drawing Sheets

Related U.S. Application Data

(60) Provisional application No. 62/414,654, filed on Oct. 28, 2016.

(56) References Cited

U.S. PATENT DOCUMENTS

| | | | |
|---|---|---|---|
| 2008/0101307 | A1 | 5/2008 | Sindhushayana et al. |
| 2009/0080384 | A1 | 3/2009 | Leung |
| 2009/0191910 | A1 | 7/2009 | Athalye et al. |
| 2010/0120446 | A1 | 5/2010 | Gaal |
| 2013/0176983 | A1 | 7/2013 | Jung et al. |
| 2016/0100395 | A1 | 4/2016 | Xu et al. |
| 2016/0112961 | A1 | 4/2016 | Zhang et al. |
| 2016/0135080 | A1* | 5/2016 | Pazhyannur ........ H04W 72/044 370/329 |
| 2016/0278050 | A1* | 9/2016 | Nory ..................... H04L 5/0053 |
| 2017/0339530 | A1* | 11/2017 | Maaref ................. H04L 5/0082 |
| 2018/0124790 | A1 | 5/2018 | Yerramalli |

OTHER PUBLICATIONS

Huawei et al., "Scenario & Design Criteria on Flexible Numerologies", 3GPP TSG RAN WG 1 Meeting #84bis, R1-162156, Apr. 2, 2016, XP051080002, Retrieved from the Internet: URL:http://www.3gpp.org/ftp/tsg_ran/WG1_RL1/TSGR1_84b/Docs/, 7 pages.
International Search Report and Written Opinion—PCT/US2017/055416—ISA/EPO—Feb. 26, 2018.
Lenovo: "Discussion on Contention Based UL Transmission", 3GPP Draft; R1-167518, 3rd Generation Partnership Project (3GPP), Mobile Competence Centre; 650, Route Des Lucioles; F-06921 Sophia-Anti Polis Cedex; France, vol. RAN WG1, No. Gothenburg, Sweden; Aug. 13, 2016, XP051133048, Retrieved from the Internet: URL:http://www.3gpp.org/ftp/tsg_ran/WG1_RL1/TSGR1_86/Docs/ [retrieved on Aug. 13, 2016], 2 pages.
LG Electronics: "Remaining Issues on PUSCH Transmission in LAA", 3GPP Draft; R1-166814, 3rd Generation Partnership Project (3GPP), Mobile Competence Centre; 650, Route Des Lucioles; F-06921 Sophia-Anti Polis Cedex; France, vol. RAN WG1, No. Gothenburg, Sweden; Aug. 21, 2016, XP051125571, Retrieved from the Internet: URL:http://www.3gpp.org/ftp/Meetings_3GPP_SYNC/RAN1/Docs/ [retrieved on Aug. 21, 2016], 3 pages.
Partial International Search Report—PCT/US2017/055416—ISA/EPO—Jan. 3, 2018.
Samsung: "Details on Resource Pool design", 3GPP Draft; R1-164764, 3rd Generation Partnership Project (3GPP), Mobile Competence Centre; 650, Route Des Lucioles; F-06921 Sophia-Anti Polis Cedex; France, vol. RAN WG1, No. Nanjing, China; May 14, 2016, XP051089924, Retrieved from the Internet: URL:http://www.3gpp.org/ftp/tsg_ran/WG1_RL1/TSGR1_85/Docs/ (retrieved on May 14, 2016], 3 pages.

* cited by examiner

COEXISTENCE OF INTERLEAVED AND CONTIGUOUS UPLINK TRANSMISSIONS

CROSS REFERENCES

The present Application for patent is a Divisional of U.S. patent application Ser. No. 15/724,951 by Yerramalli entitled, "Coexistence of Interleaved and Contiguous Uplink Transmissions" filed Oct. 28, 2017, which claims the benefit of U.S. Provisional Patent Application No. 62/414,654 by Yerramalli, entitled "Coexistence of Interleaved and Contiguous Uplink Transmissions," filed Oct. 28, 2016, each of which are assigned to the assignee hereof and incorporated by reference herein for any and all purposes.

BACKGROUND

The following relates generally to wireless communication, and more specifically to coexistence of interleaved and contiguous uplink transmissions.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

Waveforms used for transmissions within a wireless communications system may have constraints such as power spectral density (PSD) limitations (e.g., PSD per MHz constraints), bandwidth occupancy constraints (e.g., operating requirement that transmissions must span or occupy at least a minimum percentage of available bandwidth), etc. In some cases, it may be desirable for different UEs to use different waveform types (e.g., interlace based waveforms, contiguous waveforms, etc.) for uplink transmissions within the same carrier bandwidth. However, different UEs using different waveform types for uplink transmissions within a carrier presents challenges in efficiently allocating resources.

SUMMARY

The described techniques relate to improved methods, systems, devices, or apparatuses that support coexistence of interleaved and contiguous uplink transmissions. Operation using different waveform types may address bandwidth occupancy requirements, power spectral density (PSD) limitations, etc. A carrier bandwidth may be split into regions allocated for interlaced resource allocations and contiguous resource allocations for frequency division multiplexing (FDM) based coexistence. To achieve coexistence of such waveform types, a base station may indicate a waveform type, a transmission carrier bandwidth or channel, and a resource block allocation (e.g., an interlace pattern, certain ranges within the carrier bandwidth, etc.) for uplink transmissions. In some cases, channel contention procedures (e.g., listen-before-talk (LBT)) and power constraints (e.g., PSD limitations) may be based on the waveform type associated with the uplink transmission. A base station may allocate frequency resources of an uplink transmission time interval (TTI) to multiple user equipments (UEs), which may operate according to different waveform types.

A method of wireless communication is described. The method may include receiving UE capability information from a plurality of UEs being served by the base station over a shared radio frequency spectrum band, determining, based on the UE capability information associated with the plurality of UEs, a logical channel allocation for the shared radio frequency spectrum band comprising an interlaced resource assignment bandwidth region and a contiguous resource assignment bandwidth region, transmitting first and second uplink resource allocations for the shared radio frequency spectrum band for an uplink transmission time interval to first and second UEs, respectively, the first uplink resource allocation comprising an interlaced resource assignment in the interlaced resource assignment bandwidth region and the second uplink resource allocation comprising a contiguous resource assignment in the contiguous resource assignment bandwidth region, and receiving respective uplink transmissions from the first and second UEs in the uplink transmission time interval over the shared radio frequency spectrum band.

An apparatus for wireless communication is described. The apparatus may include means for receiving UE capability information from a plurality of UEs being served by the base station over a shared radio frequency spectrum band, means for determining, based on the UE capability information associated with the plurality of UEs, a logical channel allocation for the shared radio frequency spectrum band comprising an interlaced resource assignment bandwidth region and a contiguous resource assignment bandwidth region, means for transmitting first and second uplink resource allocations for the shared radio frequency spectrum band for an uplink transmission time interval to first and second UEs, respectively, the first uplink resource allocation comprising an interlaced resource assignment in the interlaced resource assignment bandwidth region and the second uplink resource allocation comprising a contiguous resource assignment in the contiguous resource assignment bandwidth region, and means for receiving respective uplink transmissions from the first and second UEs in the uplink transmission time interval over the shared radio frequency spectrum band.

Another apparatus for wireless communication is described. The apparatus may include a processor, memory in electronic communication with the processor, and instructions stored in the memory. The instructions may be operable to cause the processor to receive UE capability information from a plurality of UEs being served by the base station over a shared radio frequency spectrum band, determine, based on the UE capability information associated with the plurality of UEs, a logical channel allocation for the shared radio frequency spectrum band comprising an interlaced resource assignment bandwidth region and a contiguous resource assignment bandwidth region, transmit first and second uplink resource allocations for the shared radio frequency spectrum band for an uplink transmission time interval to first and second UEs, respectively, the first uplink resource allocation comprising an interlaced resource assignment in the interlaced resource assignment bandwidth region and the second uplink resource allocation comprising a contiguous resource assignment in the contiguous resource assignment bandwidth region, and receive respective uplink transmissions from the first and second UEs in the uplink transmission time interval over the shared radio frequency spectrum band.

A non-transitory computer readable medium for wireless communication is described. The non-transitory computer-readable medium may include instructions operable to cause a processor to receive UE capability information from a plurality of UEs being served by the base station over a shared radio frequency spectrum band, determine, based on the UE capability information associated with the plurality of UEs, a logical channel allocation for the shared radio frequency spectrum band comprising an interlaced resource assignment bandwidth region and a contiguous resource assignment bandwidth region, transmit first and second uplink resource allocations for the shared radio frequency spectrum band for an uplink transmission time interval to first and second UEs, respectively, the first uplink resource allocation comprising an interlaced resource assignment in the interlaced resource assignment bandwidth region and the second uplink resource allocation comprising a contiguous resource assignment in the contiguous resource assignment bandwidth region, and receive respective uplink transmissions from the first and second UEs in the uplink transmission time interval over the shared radio frequency spectrum band.

In some examples of the method, apparatus, and non-transitory computer-readable medium described above, the UE capability information comprises an interleaved waveform support indicator, a contiguous waveform support indicator, a coverage enhancement indicator, a bandwidth support indicator, or combinations thereof.

Some examples of the method, apparatus, and non-transitory computer-readable medium described above may further include processes, features, means, or instructions for identifying a power headroom for the first UE. Some examples of the method, apparatus, and non-transitory computer-readable medium described above may further include processes, features, means, or instructions for selecting the interlaced resource assignment for the first UE based at least in part on the power headroom for the first UE.

In some examples of the method, apparatus, and non-transitory computer-readable medium described above, the power headroom comprises a metric of power headroom over a frequency range.

In some examples of the method, apparatus, and non-transitory computer-readable medium described above, the first uplink resource allocation indicates a bandwidth of the interlaced resource assignment bandwidth region.

In some examples of the method, apparatus, and non-transitory computer-readable medium described above, the logical channel allocation comprises at least one narrow band resource assignment region.

A method of wireless communication is described. The method may include receiving a configuration from a serving base station for a shared radio frequency spectrum band, determining, for the shared radio frequency spectrum band, a first power headroom for a first uplink waveform type and a second power headroom for a second uplink waveform type, reporting the first and second power headroom to the serving base station, receiving an uplink resource assignment for the shared radio frequency spectrum band, wherein a waveform type for the uplink resource assignment is dependent on the reported first and second power headroom, and transmitting, to the serving base station, an uplink transmission mapped to resources of the shared radio frequency spectrum band based at least in part on the waveform type.

An apparatus for wireless communication is described. The apparatus may include means for receiving a configuration from a serving base station for a shared radio frequency spectrum band, means for determining, for the shared radio frequency spectrum band, a first power headroom for a first uplink waveform type and a second power headroom for a second uplink waveform type, means for reporting the first and second power headroom to the serving base station, means for receiving an uplink resource assignment for the shared radio frequency spectrum band, wherein a waveform type for the uplink resource assignment is dependent on the reported first and second power headroom, and means for transmitting, to the serving base station, an uplink transmission mapped to resources of the shared radio frequency spectrum band based at least in part on the waveform type.

Another apparatus for wireless communication is described. The apparatus may include a processor, memory in electronic communication with the processor, and instructions stored in the memory. The instructions may be operable to cause the processor to receive a configuration from a serving base station for a shared radio frequency spectrum band, determine, for the shared radio frequency spectrum band, a first power headroom for a first uplink waveform type and a second power headroom for a second uplink waveform type, report the first and second power headroom to the serving base station, receive an uplink resource assignment for the shared radio frequency spectrum band, wherein a waveform type for the uplink resource assignment is dependent on the reported first and second power headroom, and transmit, to the serving base station, an uplink transmission mapped to resources of the shared radio frequency spectrum band based at least in part on the waveform type.

A non-transitory computer readable medium for wireless communication is described. The non-transitory computer-readable medium may include instructions operable to cause a processor to receive a configuration from a serving base station for a shared radio frequency spectrum band, determine, for the shared radio frequency spectrum band, a first power headroom for a first uplink waveform type and a second power headroom for a second uplink waveform type, report the first and second power headroom to the serving base station, receive an uplink resource assignment for the shared radio frequency spectrum band, wherein a waveform type for the uplink resource assignment is dependent on the reported first and second power headroom, and transmit, to the serving base station, an uplink transmission mapped to resources of the shared radio frequency spectrum band based at least in part on the waveform type.

In some examples of the method, apparatus, and non-transitory computer-readable medium described above, the first uplink waveform type comprises a contiguous waveform type and the second uplink waveform type comprises an interlaced waveform type.

A method of wireless communication is described. The method may include receiving a configuration from a serving base station for a carrier in a shared radio frequency spectrum band, identifying a waveform type indicator for at least one non-data associated uplink channel of the carrier, and transmitting, to the serving base station over the carrier, an uplink transmission mapped to resources of the non-data associated uplink channel of the carrier based at least in part on the waveform type indicator.

An apparatus for wireless communication is described. The apparatus may include means for receiving a configuration from a serving base station for a carrier in a shared radio frequency spectrum band, means for identifying a waveform type indicator for at least one non-data associated uplink channel of the carrier, and means for transmitting, to the serving base station over the carrier, an uplink transmission mapped to resources of the non-data associated uplink channel of the carrier based at least in part on the waveform type indicator.

Another apparatus for wireless communication is described. The apparatus may include a processor, memory in electronic communication with the processor, and instructions stored in the memory. The instructions may be operable to cause the processor to receive a configuration from a serving base station for a carrier in a shared radio frequency spectrum band, identify a waveform type indicator for at least one non-data associated uplink channel of the carrier, and transmit, to the serving base station over the carrier, an uplink transmission mapped to resources of the non-data associated uplink channel of the carrier based at least in part on the waveform type indicator.

A non-transitory computer readable medium for wireless communication is described. The non-transitory computer-readable medium may include instructions operable to cause a processor to receive a configuration from a serving base station for a carrier in a shared radio frequency spectrum band, identify a waveform type indicator for at least one non-data associated uplink channel of the carrier, and transmit, to the serving base station over the carrier, an uplink transmission mapped to resources of the non-data associated uplink channel of the carrier based at least in part on the waveform type indicator.

Some examples of the method, apparatus, and non-transitory computer-readable medium described above may further include processes, features, means, or instructions for identifying a power headroom threshold associated with the waveform type indicator.

Some examples of the method, apparatus, and non-transitory computer-readable medium described above may further include processes, features, means, or instructions for comparing a power headroom for the carrier with the power headroom threshold. Some examples of the method, apparatus, and non-transitory computer-readable medium described above may further include processes, features, means, or instructions for selecting a waveform type for the uplink transmission based on a result of the comparison.

In some examples of the method, apparatus, and non-transitory computer-readable medium described above, the at least one non-data associated uplink channel comprises a physical uplink control channel, a physical random access channel, or a sounding reference signal channel.

Some examples of the method, apparatus, and non-transitory computer-readable medium described above may further include processes, features, means, or instructions for receiving a sounding reference signal (SRS) trigger from the serving base station, the SRS trigger comprising an indication of an SRS waveform type. Some examples of the method, apparatus, and non-transitory computer-readable medium described above may further include processes, features, means, or instructions for transmitting an SRS, the SRS mapped to resources of the shared radio frequency spectrum band based at least in part on the SRS waveform type.

In some examples of the method, apparatus, and non-transitory computer-readable medium described above, the identifying the waveform type indicator comprises receiving the waveform type indicator in a system information block broadcast over the carrier by the serving base station.

A method of wireless communication is described. The method may include receiving a configuration from a serving base station for a carrier in a shared radio frequency spectrum band, wherein the configuration comprises an energy detection configuration for the carrier, performing, for an uplink transmission, a LBT operation over a subset of frequency resources of the carrier according to the energy detection configuration, and transmitting the uplink transmission based on a result of the LBT operation.

An apparatus for wireless communication is described. The apparatus may include means for receiving a configuration from a serving base station for a carrier in a shared radio frequency spectrum band, wherein the configuration comprises an energy detection configuration for the carrier, means for performing, for an uplink transmission, a LBT operation over a subset of frequency resources of the carrier according to the energy detection configuration, and means for transmitting the uplink transmission based on a result of the LBT operation.

Another apparatus for wireless communication is described. The apparatus may include a processor, memory in electronic communication with the processor, and instructions stored in the memory. The instructions may be operable to cause the processor to receive a configuration from a serving base station for a carrier in a shared radio frequency spectrum band, wherein the configuration comprises an energy detection configuration for the carrier, perform, for an uplink transmission, a LBT operation over a subset of frequency resources of the carrier according to the energy detection configuration, and transmit the uplink transmission based on a result of the LBT operation.

A non-transitory computer readable medium for wireless communication is described. The non-transitory computer-readable medium may include instructions operable to cause a processor to receive a configuration from a serving base station for a carrier in a shared radio frequency spectrum band, wherein the configuration comprises an energy detection configuration for the carrier, perform, for an uplink transmission, a LBT operation over a subset of frequency resources of the carrier according to the energy detection configuration, and transmit the uplink transmission based on a result of the LBT operation.

In some examples of the method, apparatus, and non-transitory computer-readable medium described above, the energy detection configuration comprises a number of sub-bands for energy detection, a sub-band width for energy detection, a sub-band offset for energy detection, or a combination thereof.

Some examples of the method, apparatus, and non-transitory computer-readable medium described above may further include processes, features, means, or instructions for scaling an energy detection level for performing the LBT operation based at least in part on the energy detection configuration.

DETAILED DESCRIPTION

Figure 1:
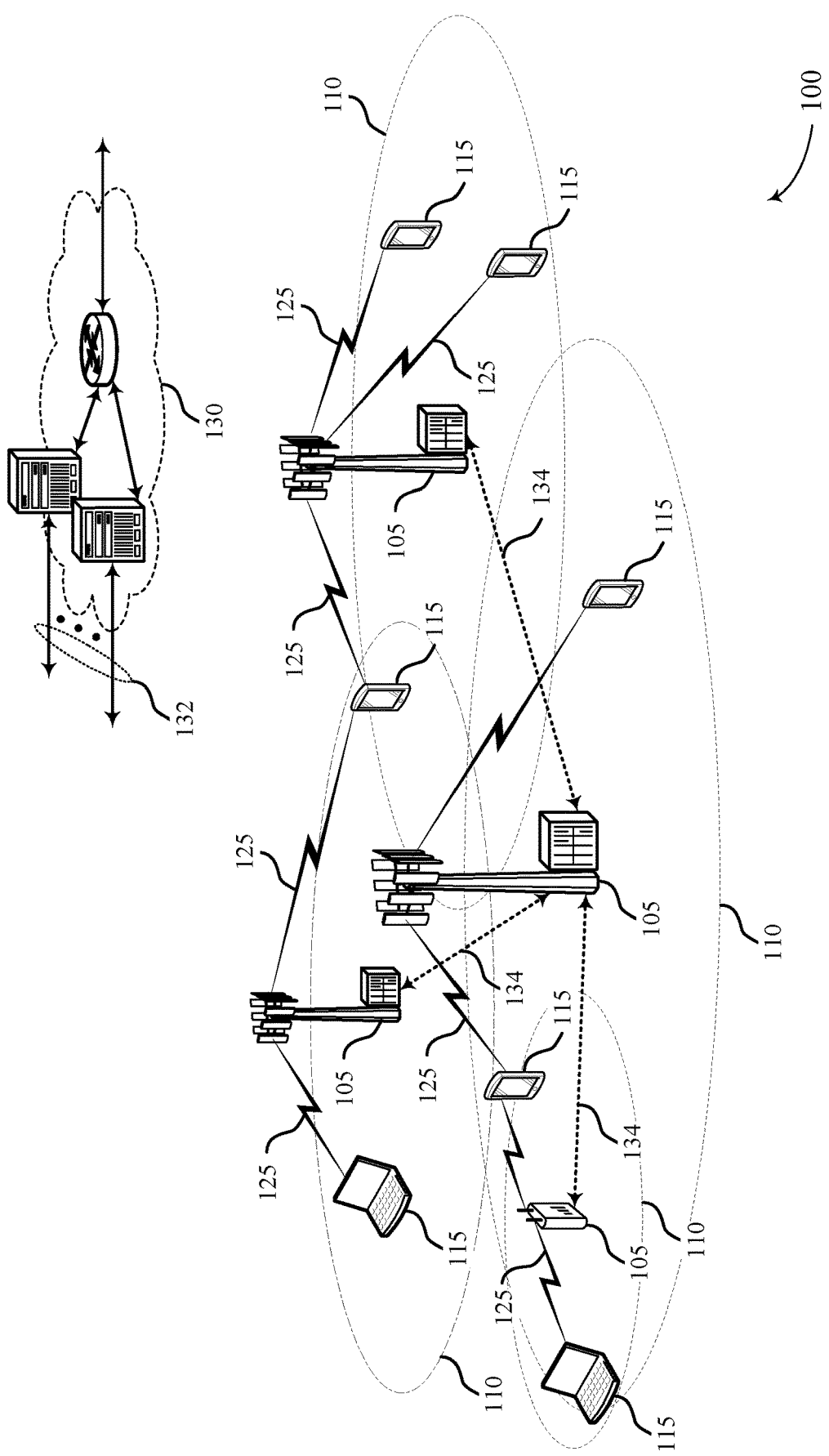
FIG. 1 illustrates an example of a system for wireless communication that supports coexistence of interleaved and contiguous uplink transmissions in accordance with aspects of the present disclosure.

The present disclosure relates to efficient allocation of resources of a carrier in a shared radio frequency spectrum band for concurrent interleaved and contiguous uplink transmissions. Shared radio frequency spectrum bands may refer to unlicensed radio frequency spectrum or radio frequency spectrum that is shared by multiple operators (e.g., a prioritized operator and one or more opportunistic operators, etc.). Operation in shared radio frequency spectrum bands may be subject to operating requirements such as bandwidth occupancy requirements (e.g., percentage of a channel over which transmissions are specified to be present for energy detection by other devices) or power spectral density (PSD) limits. Traditionally, bandwidth occupancy requirements have restricted flexibility in waveform types, with shared radio frequency bands requiring transmission across most of (e.g., greater than 50% or even 80%) a channel bandwidth that typically spans 20 MHz or more.

Flexibility in bandwidth occupancy requirements for channels in shared radio frequency spectrum bands may facilitate operation using a variety of different waveform types (e.g., waveforms covering interlaced resources, narrow band communications, etc.) in addition to waveforms covering contiguous resource allocations. Operation using different waveform types may address PSD limitations in certain situations, for example allowing a higher transmit power using fewer resources while staying under the PSD limit. However, coexistence of such waveforms may provide challenges where time flexibility is desired in allocation of resources. For example, supporting transmissions over multiple transmission time intervals (TTIs) may be inefficient using time division multiplexing (TDM) of TTIs. According to described techniques, a carrier bandwidth may be split into regions allocated for interlaced resource allocations and contiguous resource allocations for frequency division multiplexing (FDM) based coexistence. To achieve coexistence of such waveform types, a base station may indicate a waveform type, a transmission carrier bandwidth or channel, and a resource allocation (e.g., an interlace pattern, certain ranges within the carrier bandwidth, etc.) for uplink transmissions. Interlace patterns may be defined in terms of resource units such as resource blocks (RBs), tones, subsets of RBs, etc. Further, interlace patterns may include different numbers of contiguous subcarriers and/or subcarrier spacings for interleaved resources. Different interlace patterns may be allocated within different regions, and transmissions according to different interlace patterns may be considered different waveform types. In some cases, channel contention procedures and power constraints may be based on the waveform type associated with the uplink transmission (e.g., which may be based on different user equipment (UE) capabilities).

A base station may allocate frequency resources of an uplink TTI to multiple UEs, which may operate according to different waveform types. In some cases, the base station may allocate frequency resources based on predetermined network capabilities and/or UE capability signaling (e.g., UE indications of supported waveforms, multiplexing, etc.). Allocated uplink resources may include an uplink channel comprising a number of allocated interlaces of RBs, tones, subsets of RBs, etc. for use by a UE. Uplink transmission may occur across one or more interlaces. An interlace of resource units may include groups of one or more contiguous resource units (e.g., RBs, tones, subsets of RBs, etc.) that are separated in frequency by other resource units. The one or more resource units may be selected in such a manner that the resource units span a desired percentage of the available bandwidth of the shared radio frequency spectrum band. Alternatively, the one or more resource units may be selected to facilitate transmission of a particular waveform type (e.g., DFT-S-FDMA, OFDM, eMTC, etc.). Further interlaced resource allocation and contiguous allocation may span a subset of the carrier bandwidth, as discussed in more detail below.

In some examples, following the mapping onto resource elements associated with the allocated interlaces of resource units, additional uplink processing may be performed, such as an inverse fast Fourier transform (IFFT) or inverse discrete Fourier transform (IDFT), for example, and the signal may be transmitted. Interlace-based waveforms may use DFT spreading within each resource unit, thus resulting in a DFT-spread-FDMA (DFT-S-FDMA) waveform which, although not a true single-carrier waveform such as SC-FDMA, may have improved peak to average power ratio (PAPR) compared to OFDM. In some examples, resources of different types of uplink channels, such as a physical uplink control channel (PUCCH), physical uplink shared channel (PUSCH) and/or a physical random access channel (PRACH) may be allocated using interlaces of RBs or fractions of RBs in one or more TTIs. In some examples, data transmitted using the PRACH may be may be spread on the allocated interlace(s) of resource units according to a spreading technique, such as a Zadoff-Chu spreading technique, and the data transmitted using resources determined by the spreading technique in order to reduce the likelihood of a collision with data transmitted by another transmitter. Further, a UE's contention procedure (e.g., listen-before-talk (LBT)) may depend on the waveform type, allocated resources, and transmission power.

Aspects of the disclosure are initially described in the context of a wireless communications system. Examples of wireless systems supporting coexistence of interleaved and contiguous waveforms in addition to resource allocations supporting such coexisting waveforms are then described. Aspects of the disclosure are further illustrated by and described with reference to apparatus diagrams, system diagrams, and flowcharts that relate to coexistence of interleaved and contiguous uplink transmissions.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a LTE (or LTE-Advanced) network, or a New Radio (NR) network. In some cases, wireless communications system 100 may support enhanced broadband communications, ultra-reliable (i.e., mission critical) communications, low latency communications, and communications with low-cost and low-complexity devices.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink channel or downlink according to various techniques. Control information and data may be multiplexed on a downlink channel, for example, using TDM techniques, FDM techniques, or hybrid TDM-FDM techniques. In some examples, the control information transmitted during a TTI of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communications system may be configured to provide ultra-reliable communications for these functions.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

A base station 105 may be connected by an S1 interface to the core network 130. The core network may be an evolved packet core (EPC), which may include at least one MME, at least one S-GW, and at least one P-GW. The MME may be the control node that processes the signaling between the UE 115 and the EPC. All user IP packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service (PSS).

The core network 130 may provide user authentication, access authorization, tracking, Internet Protocol (IP) connectivity, and other access, routing, or mobility functions. At least some of the network devices, such as base station 105 may include subcomponents such as an access network entity, which may be an example of an access node controller (ANC). Each access network entity may communicate with a number of UEs 115 through a number of other access network transmission entities, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate in an ultra-high frequency (UHF) frequency region using frequency bands from 700 MHz to 2600 MHz (2.6 GHz), although in some cases WLAN networks may use frequencies as high as 10 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, wireless communications system 100 may support millimeter wave (mmW) communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape and/or steer an overall antenna beam in the direction of a target receiver (e.g., a UE 115). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g., a base station) and a receiver (e.g., a UE), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid ARQ (HARQ) to provide retransmission at the MAC layer to improve link efficiency. In the control plane, the Radio Resource Control (RRC) protocol layer may provide establishment, configuration, and maintenance of an RRC connection between a UE 115 and a network device, network device, or core network 130 supporting radio bearers for user plane data. At the Physical (PHY) layer, transport channels may be mapped to physical channels.

Time intervals in LTE or NR may be expressed in multiples of a basic time unit (which may be a sampling period of $T_s=1/30,720,000$ seconds). Time resources may be organized according to radio frames of length of 10 ms ($T_f=307200\ T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a TTI. In other cases, a TTI may be shorter than a subframe or may be dynamically selected (e.g., in short TTI bursts or in selected component carriers using short TTIs).

A resource element may consist of one symbol period and one subcarrier (e.g., a 15 KHz frequency range). A resource block may contain 12 consecutive subcarriers in the frequency domain and, for a normal cyclic prefix in each OFDM symbol, 7 consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE receives and the higher the modulation scheme, the higher the data rate may be. In some cases, a resource block may refer to a different number of subcarriers and aspects of techniques described herein may be applied to such resource blocks by analogy.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

In some cases, wireless communications system 100 may utilize enhanced component carriers (eCCs). An eCC may be characterized by one or more features including: wider bandwidth, shorter symbol duration, shorter TTIs, and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may consist of one or multiple symbols. In some cases, the TTI duration (that is, the number of symbols in a TTI) may be variable.

In some cases, wireless communications system 100 may utilize both licensed and shared radio frequency bands. For example, wireless communications system 100 may employ LTE License Assisted Access (LTE-LAA) or LTE Unlicensed (LTE U) radio access technology or NR technology in an unlicensed band such as the 5 Ghz Industrial, Scientific, and Medical (ISM) band. When operating in unlicensed radio frequency spectrum bands, wireless devices such as base stations 105 and UEs 115 may employ LBT procedures to ensure the channel is clear before transmitting data. In some cases, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on frequency division duplexing (FDD), time division duplexing (TDD) or a combination of both.

Figure 2:
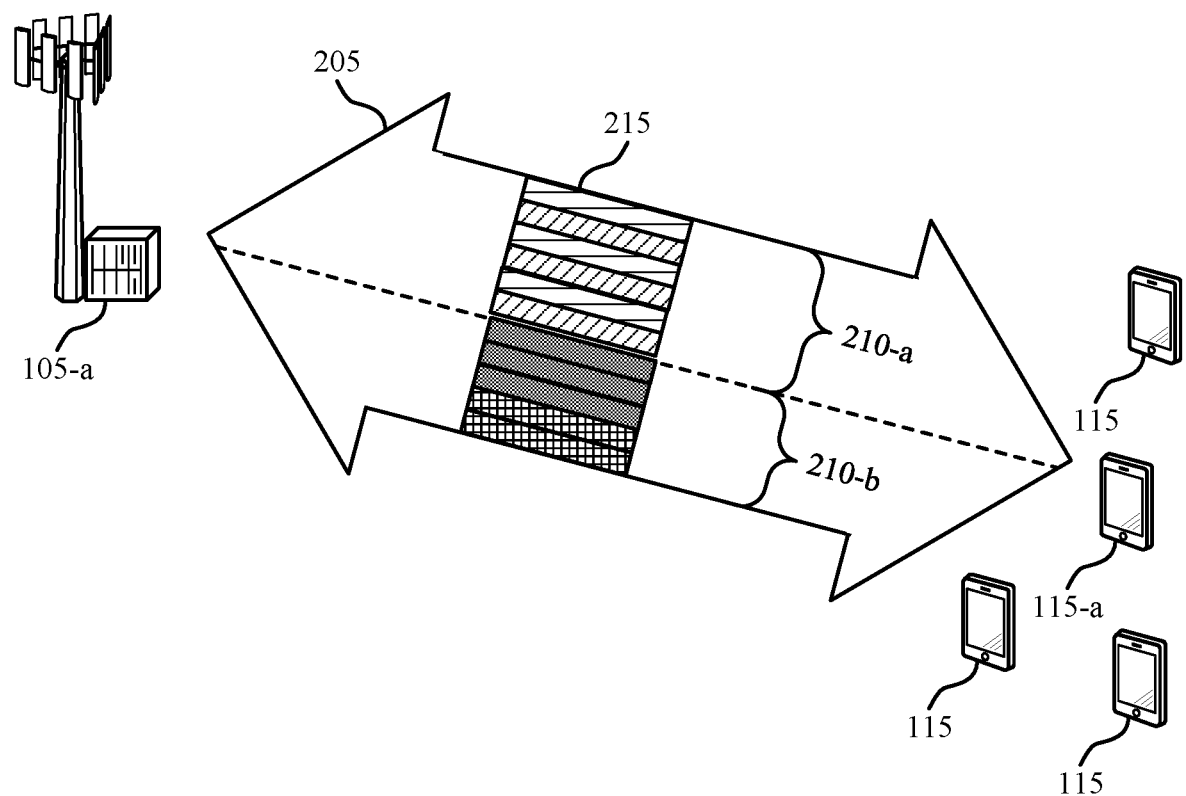
FIG. 2 illustrates an example of a wireless communications system that supports coexistence of interleaved and contiguous uplink transmissions in accordance with aspects of the present disclosure.

FIG. 2 illustrates an example of a wireless communications system 200 for coexistence of interleaved and contiguous uplink transmissions. Wireless communications system 200 may include base station 105-a and UE 115-a (in addition to other UEs 115), which may be examples of the corresponding devices described with reference to FIG. 1. Base station 105-a may communicate with UEs 115 via communications 205 over a carrier bandwidth or channel. The carrier bandwidth of communications 205 may be divided into one or more bandwidth regions 210. Resource units 215 may be used for transmissions within bandwidth regions 210, according to the type of waveform supported in the particular bandwidth region. The example of FIG. 2 is given for illustrative purposes only. Aspects of techniques described herein may be applied to carrier bandwidths divided into a different number of bandwidth regions containing a different number and ordering of resource units by analogy. For example, carrier bandwidths may be divided into bandwidth regions on a per subcarrier basis, per resource block basis, per subset of subcarriers basis, etc. Further, a bandwidth region designated as an interlaced region may have resources allocated according to, for example, and one or more interlace patterns (e.g., which may be defined on a per subcarrier basis, per resource block basis, per subset of subcarriers basis, per tone basis, etc.).

In some cases, waveforms used for communications 205 may have bandwidth occupancy constraints. That is, the one or more contiguous resource units (e.g., resource units 215 in bandwidth region 210-a) or non-contiguous resource units (e.g., resource units 215 in bandwidth region 210-b) may be selected in such a manner that the resource units 215 span at least the desired percentage (e.g., 80%) of the available bandwidth of the shared radio frequency spectrum band. However, wireless communications system 200 may be associated with reduced (e.g., 10%) or, in some cases, non-existent bandwidth occupancy constraints. In one example, in a 20 MHz channel, transmissions may occupy as little as 2 MHz for short periods of time without relinquishing the channel. Increased flexibility in bandwidth occupancy may facilitate the use of interlaced resource allocations, which may assist in providing improved communications (e.g., coverage enhancement (CE), etc.) while adhering to PSD limitations. The term resource unit, as used in the present description, may refer to a RB, sub RB, tone, subtone, carrier, subcarrier, or some other suitable unit of frequency bandwidth depending on system specific implementation.

As illustrated in FIG. 2, the carrier bandwidth or channel associated with communications 205 is split into regions allocated for interlaced waveforms (e.g., bandwidth region 210-a) and contiguous waveforms (e.g., bandwidth region 210-b) for FDM based coexistence. In some cases, base station 105-a may indicate a waveform type, a transmission bandwidth or region bandwidth, and/or a resource unit allocation (e.g., an interlace pattern, etc.) for UE 115-a uplink transmissions based on PSD limitations, bandwidth occupancy limitations, etc. In some examples, bandwidth regions may be allocated semi-statically (e.g., in system information or radio resource control (RRC) signaling, etc.), which may reduce the amount of overhead in dynamic assignments (e.g., downlink control information (DCI), etc.). In some cases, channel contention procedures and power constraints may be based on the waveform type associated with the uplink transmission.

Interlaced waveforms refer to composite signals generated using multiple interlaces of resource units 215. An interlace of resource units may be uniformly spaced across an interlaced region of the carrier bandwidth. In some cases, the multiple interlaces may be shifted versions of each other. In one example, if communications 205 are associated with a 20 MHz channel, a first interlace may include every tenth resource unit (e.g., RB 0, RB 10, RB 20 . . . RB 90), a second interlace may include every tenth resource unit with a one resource unit offset (e.g., RB 1, RB 11, RB 21 . . . ), and so forth. In some cases, interlaces may include resource units that are not evenly spaced. Interlaces may be spaced by a variable number of resource units (e.g., indicated by base station 105-a). For example, a first interlace may include resource units spaced by 5 resource blocks (e.g., RB 0, RB 5, RB 25 . . . ). Additionally, interlaces may include a number of contiguous resource units in each interlace segment, which may be indicated by base station 105-a. For example, an interlace may include every other set of 3 contiguous resource blocks (e.g., RB 0, RB 1, RB 2, RB 6, RB 7, RB 8, RB 12 . . . for a first interlace and RB 3, RB 4, RB 5, RB 9, RB 10, RB 11, RB 15 . . . for a second interlace). That is, allocated resources (e.g., interlaces) within bandwidth region 210-a may be variable with parameters defining such interlaces indicated by base station 105-a. Such interlace parameters may include a starting resource unit (e.g., an offset or interlace number), a number of contiguous resource units, and a spacing of resource units. As interlaced waveforms may include a number of contiguous resource units that are interleaved, contiguous waveforms may refer to a number of contiguous resource units that are not interleaved (e.g., all resource units associated with the transmission are contiguous).

For example, a 20 MHz carrier bandwidth or channel associated with communications 205 may be divided into a 5 MHz bandwidth region for interleaved waveforms (e.g., bandwidth region 210-*a*) and a 15 MHz bandwidth region for contiguous waveforms (e.g., bandwidth region 210-*b*). The 5 MHz bandwidth region for interleaved waveforms may include, for example, 25 resource blocks. The 5 MHz bandwidth region may include a different number of interlaces depending on interlace parameters. For example, if base station 105-*a* configures an interlace spacing of 5 resource blocks, bandwidth region 210-*a* may facilitate 5 interlaces. The 15 MHz bandwidth region may support contiguous transmissions (e.g., not interlaced). In some cases, interlaced waveform transmissions may be transmitted at a higher power without violating PSD limits because they are not transmitted using contiguous resources across the entire bandwidth (e.g., the energy of an interlaced waveform transmission within a given sub-band may be lower because the total energy is spread over a larger region than if it were transmitted using contiguous resources of the sub-band).

Contiguous waveforms may include contiguous or consecutive resource units 215. For example, the occupied bandwidth may include RB 0, RB 1, RB 2, etc. In some cases, contiguous waveforms may be associated with a lower peak-to-average power ratio (PAPR), and may be easier to detect (e.g., by other users), thus reducing potential interference. Wireless communications system 200 may support coexistence of interlaced and contiguous transmissions. For example, wireless communications system 200 may facilitate concurrent uplink transmissions of both waveforms from different UEs within the system.

In some cases, wireless communications system 200 may additionally support narrow band (e.g., eMTC transmissions). For example, communications 205 may additionally include a narrow band bandwidth region (e.g., 1.4 MHz, 2 MHz, etc.) for narrow band transmissions (not shown). The carrier bandwidth may be divided into multiple bandwidth regions 210 according to a number of different waveforms or transmission types supported. Interlace patterns may include a different subcarrier spacing for different interlaced regions. Parameters that may be different for different interlace regions may include subcarrier spacing, a starting resource (e.g., an offset or interlace number), a number of contiguous resources (e.g., subcarriers, resource units, etc.), and a spacing of interlaced resources. For example, the carrier bandwidth of communications 205 may be divided into three bandwidth regions respectively associated with interleaved waveforms, contiguous waveforms, and waveforms for narrow band communications. For single and/or multi-TTI transmissions by UEs 115 supporting eMTC or wideband eMTC, FDM based waveform coexistence may be employed (e.g., for such narrow band transmissions).

Wireless communications system 200 may multiplex waveforms in multiple configurations and may select configurations based on which configurations work for UEs 115 within the system (e.g., based on UE 115 capabilities). For example, UE 115-*a* may indicate waveform capability (e.g., which waveform types it can support), which may be dependent on operating mode (e.g., a CE mode, etc.) or a configured bandwidth. For example, when operating in a license assisted access (LAA) mode, a UE 115 may support both interleaved and contiguous waveform transmission. In another example, when operating in a CE mode with 5 MHz bandwidth support, a UE 115 may support both 5 resource block interlace or 6 resource block regular contiguous waveform with hopping over multiple narrow bands within 5 MHz. In yet another example, when operating in CE mode with 1.4 MHz bandwidth support, a UE 115 may support only contiguous waveform transmissions. Such waveform configurations or waveform format signaling may be included in, for example, DCI.

As a base station 105 may allocate regions for different waveform types, the base station 105 and UEs 115 may have different transmission bandwidths. For example, 50 resource blocks (e.g., 10 narrow bands) may be dedicated to eMTC UEs 115 and 50 remaining resource blocks may be used by interlace based transmission for regular (e.g., non-eMTC) UEs 115. In another example, 25 resource blocks may be used for interlace based transmissions and the remaining resource blocks may be used for regular (e.g., non-eMTC) UEs 115 with contiguous waveforms, etc. Different waveform patterns may be supported for different UEs. For example, 25 resource blocks may be allocated to UEs to support 5 resource block interlace based transmission (e.g., RB 0, RB 5, RB 10 . . . ) and 50 resource blocks may be allocated to UEs to support 10 resource block interlace based transmission in another region of the carrier bandwidth.

If power constraints (e.g., PSD limitations) exist in the operating band (e.g., bandwidth region 210-*a* and/or bandwidth region 210-*b*), transmissions may be configured based on the waveform. As an example, for a single UE 115-*a*, physical uplink shared channel (PUSCH) transmission may be configured to be based on a contiguous waveform when the UE 115-*a* is not power limited. When UE 115-*a* is power limited, UE 115-*a* may switch to interlace based allocation to enable transmission at a higher power for each interlace segment. In some cases, UE 115-*a* may be configured with a pathloss threshold used for switching between waveform types, or information in a power headroom report (PHR) may be used by the base station 105-*a* to determine the waveform type to be used by the UE 115-*a*. In some cases, the PHR from the UE may include multiple PHR values for each of several waveform types (e.g., contiguous, interlaced, narrow-band, etc.), or may report power headroom per MHz.

Contention procedures (e.g., LBT) may be based on the waveform type associated with the uplink transmission. That is, UE 115 LBT operation may be a function of the waveform type, the bandwidth used, and transmission power. For example, a 1.4 MHz UE 115 using contiguous waveform transmission may perform LBT over one or more narrow bands with an energy detection threshold scaled accordingly. If the LBT is performed over multiple narrow bands, the base station 105 may configure a number of narrow bands to be used for performing energy sensing. In some cases, the energy sensing may be performed for a longer duration with narrow band UEs 115 (e.g., ≥25 us) to accurately estimate energy levels present. Further, wideband UEs 115 supporting interlace based transmissions (e.g., ≥5 MHz) may perform LBT over the entire carrier bandwidth (e.g., 20 MHz) or interlace region to reduce interference with other devices (e.g., other UEs 115). Additionally, a base station (e.g., a wideband base station) may perform LBT and energy sensing over the entire carrier bandwidth for contention (e.g., to clear the medium). In some cases, the start of transmissions may be synchronized irrespective of the bandwidth and duration of energy sensing in order to reduce inter-UE blocking.

Figure 3:
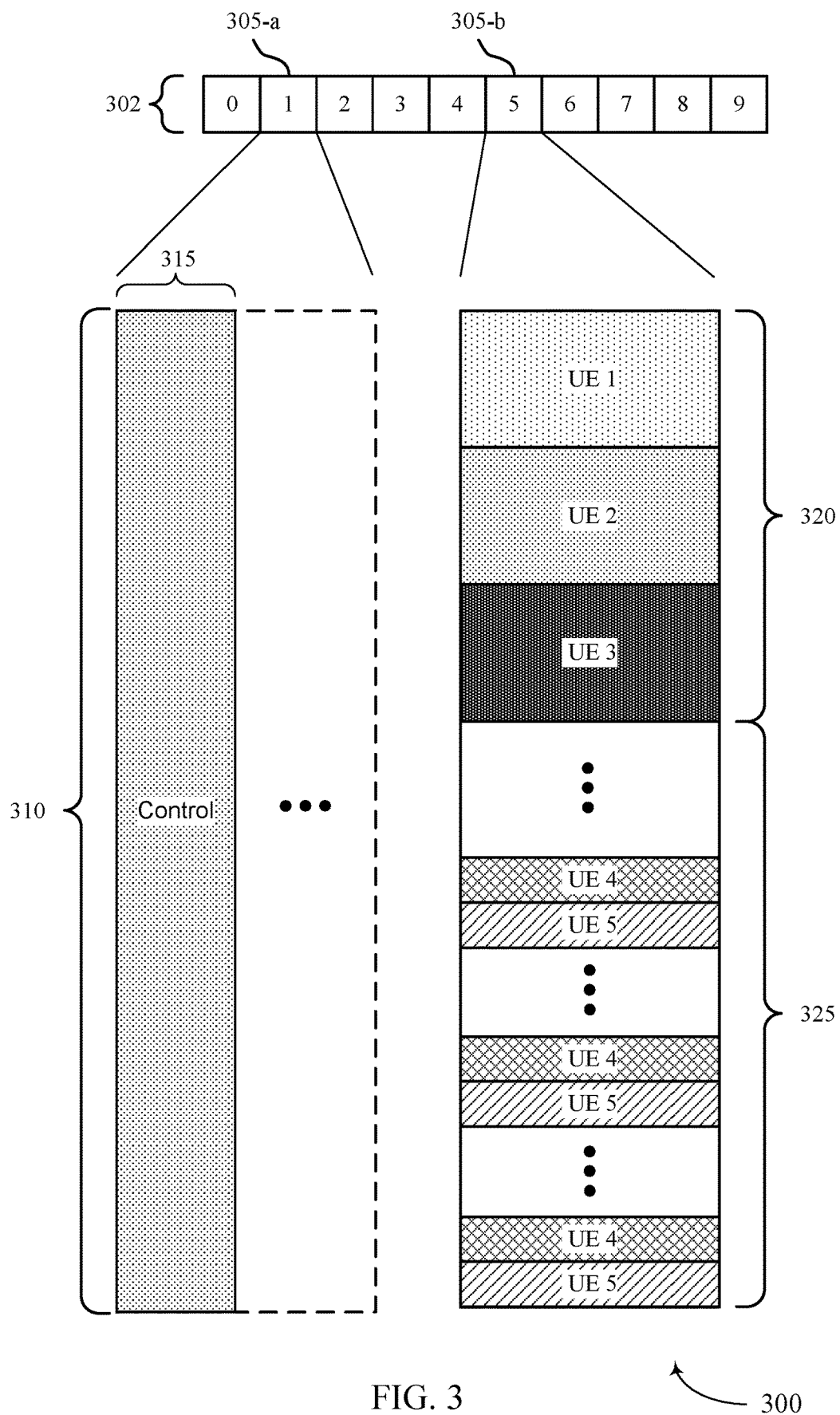
FIG. 3 illustrates an example of a resource configuration that supports coexistence of interleaved and contiguous uplink transmissions in accordance with aspects of the present disclosure.

FIG. 3 illustrates an example of a resource configuration 300 for coexistence of interleaved and contiguous uplink transmissions. Resource configuration 300 may be used for communication over a shared radio frequency spectrum band between multiple UEs 115 and base stations 105 via a carrier 302, which may be examples of the corresponding devices described with reference to FIGS. 1 and 2.

System resources of carrier 302 may be divided in time, e.g., into a plurality of TTIs 305, as described with reference to FIGS. 1 and 2. In some cases, resources associated with a single TTI 305 may be allocated either for uplink or downlink information (e.g., TTIs 305 may be time division duplexed). As an example, base station 105 may allocate TTI 305-a as a downlink TTI for the carrier, while TTI 305-b may be allocated for uplink transmissions.

Carrier 302 may be associated with a carrier bandwidth 310 (e.g., 20 MHz), and may have a common synchronization signal (e.g., primary synchronization signal (PSS), secondary synchronization signal (SSS), etc.) and broadcast channels (e.g., including system information such as a master information block (MIB), system information blocks (SIBs), etc.) that carry common system information for the carrier 302. TTI 305-a may contain a control channel 315, which may include uplink resource allocations for TTI 305-b. Control channel 315 may occupy a portion of the time-frequency resources of TTI 305-a (e.g., spanning the carrier bandwidth 310 for a portion of the time resources of TTI 305-a, etc.). The remaining time-frequency resources of TTI 305-a may be allocated for transmission of downlink data.

TTI 305-b may additionally be associated with carrier bandwidth 310. In some cases, a base station 105 may divide carrier bandwidth 310 into contiguous waveform bandwidth region 320 and interlaced waveform bandwidth region 325. In the present example, interlaced waveform bandwidth region 325 may span some fraction of carrier bandwidth 310. Interlaced waveform bandwidth region 325 may be further divided (e.g., into multiple interlaced waveform bandwidth regions in frequency). In aspects of the present disclosure, the narrowest frequency division for a waveform type associated with a time duration (e.g., a TTI 305) may be a resource unit or a subcarrier. As an example, each of the shaded regions in interlaced waveform bandwidth region 325 may be a resource unit or a subcarrier. In some cases, a UE communicating over carrier bandwidth 310 may be allocated (e.g., via control channel 315 information) one or more resource units or subcarriers associated with interlaced waveform bandwidth region 325. The one or more resource units or subcarriers may be allocated in groups, and may be separated from each other by one or more resource units or subcarriers associated with another UE communicating over the same carrier bandwidth 310. As discussed above, the interlaced waveform bandwidth region 325 may be divided into multiple interlaced waveform bandwidth regions 325, where a different subcarrier spacing may be used for different regions. Different regions may also have different interlace parameters (e.g., bandwidth, subcarrier based interlacing, resource unit based interlacing, number of subcarriers or resource units in each contiguous section of an interlace, number of subcarriers or resource units between contiguous sections, etc.).

Contiguous waveform bandwidth region 320 may span a portion of carrier bandwidth 310. In some cases, the remaining portion (e.g., interlaced waveform bandwidth region 325) may be used for interlaced transmissions. In other cases, the remaining portion of carrier bandwidth 310 may be further divided into two fractions respectively reserved for contiguous waveform transmission and narrow band transmissions. One or more resource units may be assigned to a given UE (e.g., via control channel 315 information). These resource units may be located next to each other in frequency (e.g., they may be contiguous). In the present example, each of the shaded regions in contiguous waveform bandwidth region 320 may include multiple resource units. In aspects of the present disclosure, during an uplink TTI 305-b, a UE may transmit over one of contiguous waveform bandwidth region 320, interlaced waveform bandwidth region 325, or a narrowband communication bandwidth region (not shown).

Figure 4:
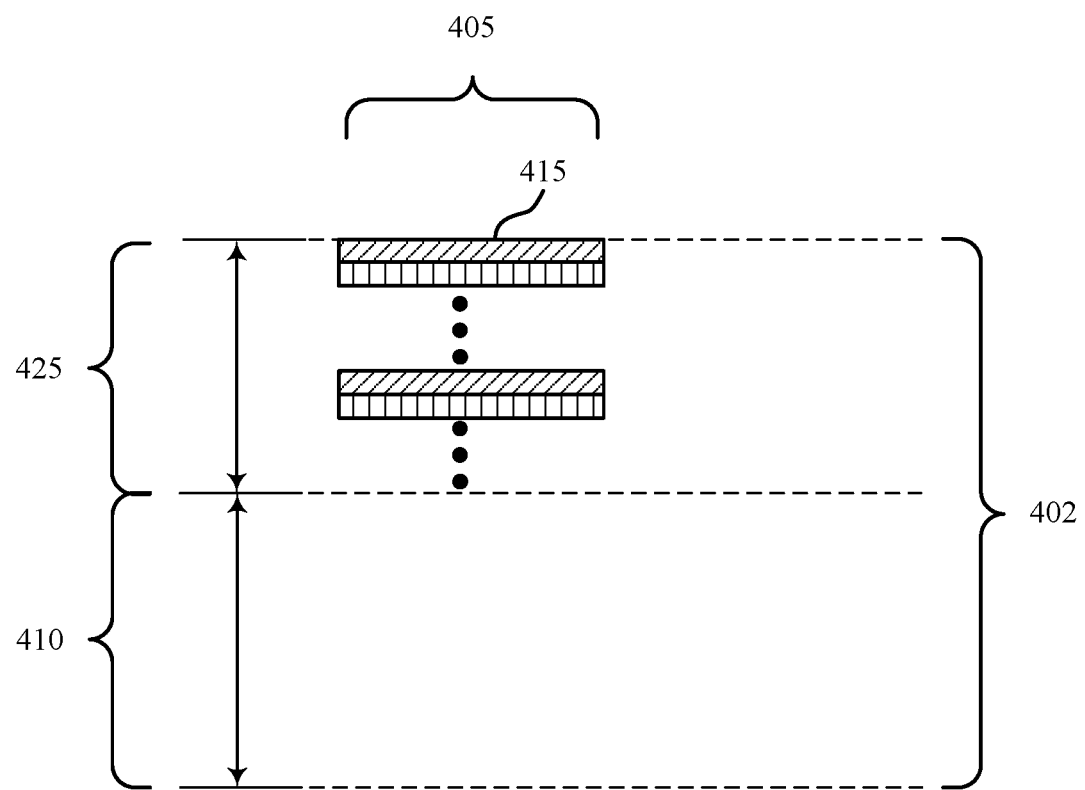
FIG. 4 illustrates an example of a resource configuration that supports coexistence of interleaved and contiguous uplink transmissions in accordance with aspects of the present disclosure.

FIG. 4 illustrates an example of a resource configuration 400 for coexistence of interleaved and contiguous uplink transmissions. Resource configuration 400 may be used for communication over a shared radio frequency spectrum band between multiple UEs 115 and base stations 105, which may be examples of the corresponding devices described with reference to FIGS. 1 and 2.

Resource configuration 400 may include a control bandwidth region 425 and a shared bandwidth region 410 of a carrier 402. For example, control bandwidth region 425 may be used for control channel transmissions (e.g., non-data associated uplink channels) such as PUCCH transmissions or PRACH transmissions. Shared bandwidth region 410 may be used for data transmissions, or other transmissions, and may be allocated or divided into bandwidth portions associated with interlaced and contiguous uplink transmissions, as described with reference to FIG. 3. Additionally, sounding reference signal (SRS) transmissions may be mapped to interlaced resources of the carrier 402. For example, UEs 115 configured for operation using interlaced uplink data or control transmissions may also use interlaced SRS resources. In some cases, SRS may be dynamically triggered, in which case the trigger may include dynamic indication of a waveform type for the SRS.

Resource units 415 within control bandwidth region 425 may be used for transmission of control transmissions such as PUCCH, PRACH, SRS, etc. UEs configured for operation over carrier 402 may support contiguous or interlaced transmission over control bandwidth region 425, and may be semi-statically configured for contiguous or interlaced transmission. The interlacing parameters (e.g., subcarrier based interlacing, resource unit based interlacing, number of subcarriers or resource units in each contiguous section of an interlace, number of subcarriers or resource units between contiguous sections, etc.) may be configurable for control bandwidth region 425. Each uplink channel (e.g., PUCCH, PRACH, etc.) or uplink channel information (UCI) format may be configured with an operating bandwidth, a waveform type, and may be used in different scenarios similar to those described above with reference to FIGS. 2 and 3 (e.g., similar to waveform selection for PUSCH transmission). In the example illustration of FIG. 4, differently shaded regions may represent control transmissions associated with different UEs 115. Additionally, resource units 415 may be further defined in terms of time. For example, an interlace pattern of resource units 415 may be defined for a time duration 405. In some cases, time duration 405 may refer to one or more TTIs for which the resource units 415 are allocated to different UEs. In some examples different configurations for the resource units 415 may be provided for different time durations 405 (e.g., different subframes may be configured according to different interlacing parameters for a bandwidth region). Other time durations may have similar or different allocation or ordering of resource units 415.

Figure 5:
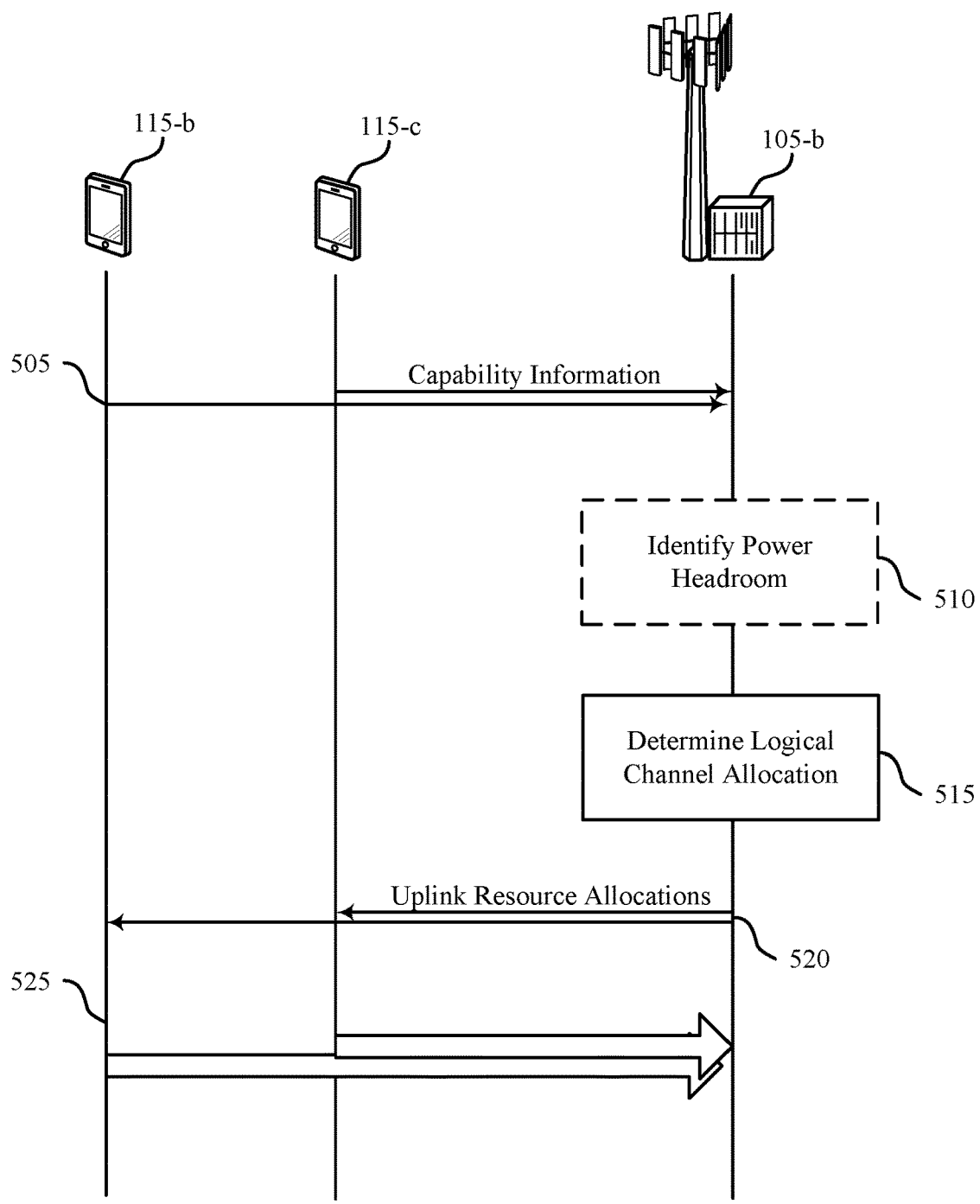
FIG. 5 illustrates an example of a process flow that supports coexistence of interleaved and contiguous uplink transmissions in accordance with aspects of the present disclosure.

FIG. 5 illustrates an example of a process flow 500 for coexistence of interleaved and contiguous uplink transmissions in accordance with aspects of the present disclosure.

UEs 115 and base station 105-*b* may be examples of the corresponding devices described with reference to FIGS. 1 and 2. In aspects, UEs 115 and base station 105-*b* may be communicating over a shared radio frequency spectrum band, as described with reference to FIG. 2.

At step 505, base station 105-*b* may receive capability information from the UEs 115. In some cases, capability information may refer to any of a waveform support indicator, a coverage enhancement indicator, a bandwidth support indicator, subcarrier spacing(s) supported, or some combination thereof. In the present example, UE 115-*b* may indicate that it is operable to communicate using an interleaved waveform, while UE 115-*c* may indicate that it is operable to communicate using a contiguous waveform.

At step 510, base station 105-*b* may optionally identify a power headroom associated with a UE operable to communicate using an interlaced waveform (e.g., UE 115-*b* in the present example). In some cases, UEs 115 may report separate power headroom values for each waveform type, or may include a metric of power headroom over a given frequency range.

At step 515, base station 105-*b* may determine a logical channel allocation for the shared radio frequency spectrum band based at least in part on the UE capability information. In some cases, the logical channel allocation may include an interlaced (e.g., interleaved) resource assignment bandwidth region and a contiguous resource assignment bandwidth region, as described above with reference to FIG. 3. For example, the base station 105-*b* may receive the UE capability information (e.g., via UE capability indications) and may determine the size of the interlaced resource assignment bandwidth region and one or more interlace patterns based on the capability information. The base station 105-*b* may receive an indication that UE 115-*b* supports interlaced waveforms, and may determine an interlace pattern for UE 115-*b* based on the waveform type supported by UE 115-*b*. The logical channel allocation may be configured semi-statically for the carrier and may be communicated to UEs 115 in system information or RRC signaling (not shown). In some aspects, the logical channel allocation may be based at least in part on the power headroom information.

At step 520, base station 105-*b* may transmit uplink resource allocations to the UEs 115 based on the logical channel allocation and, optionally, the power headroom information. In some cases, a first uplink resource allocation may be associated with the interlaced resource bandwidth region (e.g., for UE 115-*b*) and a second uplink resource allocation may be associated with the contiguous resource bandwidth region (e.g., for UE 115-*c*). In some cases, the first uplink resource allocation may indicate a bandwidth of the interlaced resource assignment bandwidth region. Additionally or alternatively, the logical channel allocation may include at least one narrow band resource assignment region.

At step 525, base station 105-*b* may receive uplink transmissions from UEs 115 in the allocated TTIs and over the allocated frequency resources.

Figure 6:
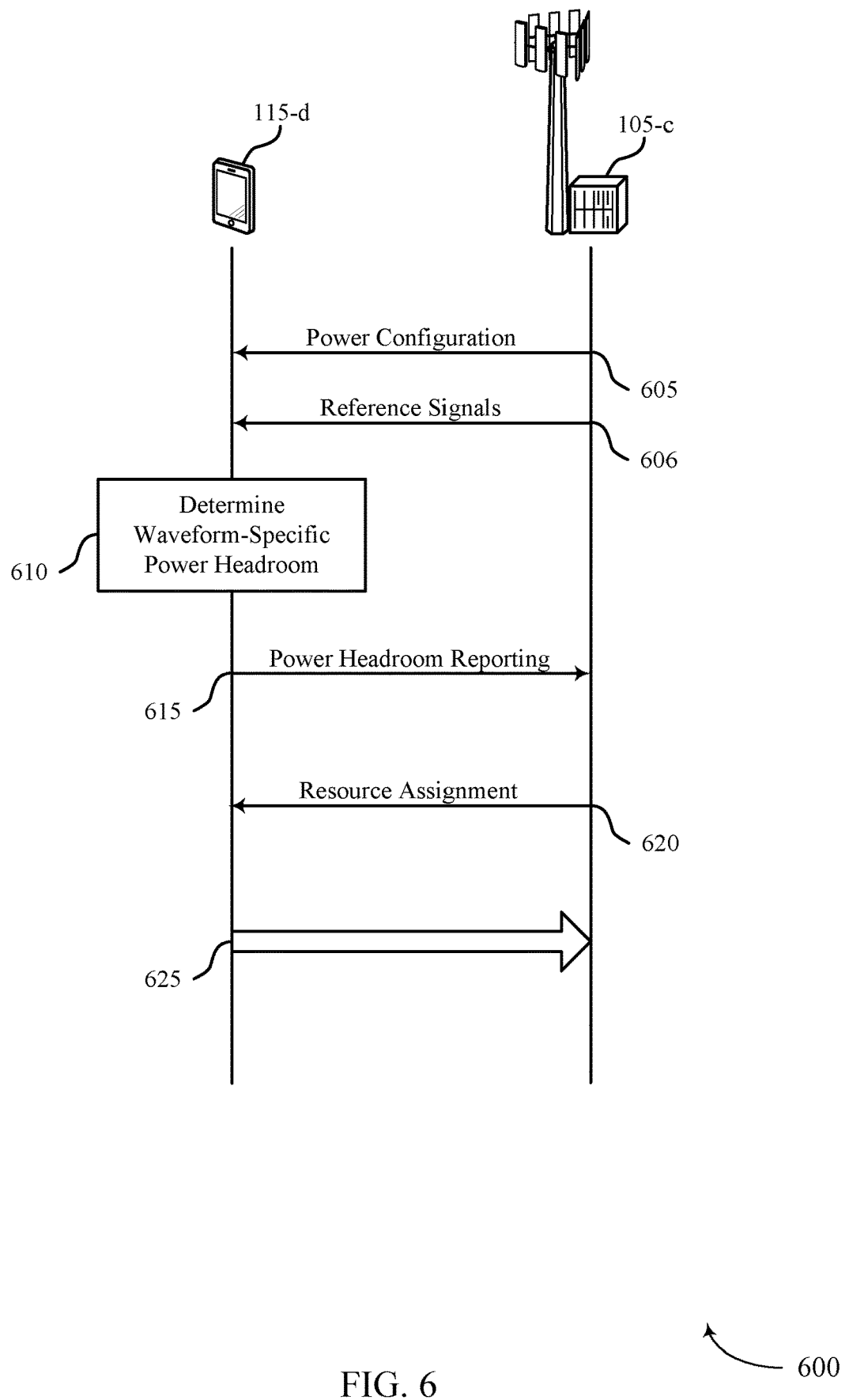
FIG. 6 illustrates an example of a process flow that supports coexistence of interleaved and contiguous uplink transmissions in accordance with aspects of the present disclosure.

FIG. 6 illustrates an example of a process flow 600 for coexistence of interleaved and contiguous uplink transmissions, in accordance with aspects of the present disclosure. UE 115-*d* and base station 105-*c* may be examples of the corresponding devices described with reference to FIGS. 1 and 2. In some cases, UE 115-*d* and base station 105-*c* may be communicating over a shared radio frequency spectrum band, as described with reference to FIG. 2. In aspects of the present example, UE 115-*d* may be operable to communicate with base station 105-*c* using contiguous and interlaced waveforms. In aspects, the resources associated with these waveform types may be allocated dynamically.

At step 605, UE 115-*d* may receive a power configuration from base station 105-*c*. In some cases, this power configuration may indicate one or more bandwidths associated with a communication. Additionally or alternatively, the power configuration may indicate one or more waveform types (e.g., contiguous or interlaced waveforms).

In some cases, at step 606, UE 115-*d* may receive reference signals (e.g., CRS, CSI-RS, etc.). The reference signals may be used by the UE 115-*d* for measurements (e.g., path loss) that indicate a transmit power for uplink signals. Additionally or alternatively, the UE 115-*d* may receive power control signals (e.g., transmit power control (TPC) indicators) from the eNB 105-*c* associated with closed loop power control.

At step 610, UE 115-*d* may determine waveform-specific power headroom. As an example, UE 115-*d* may determine a first power headroom for a first waveform (e.g., an interlaced waveform) and a second power headroom for a second waveform (e.g., a contiguous waveform).

At step 615, UE 115-*d* may transmit the first and second power headroom to base station 105-*c*.

At step 620, UE 115-*d* may receive an uplink resource assignment for the shared radio frequency spectrum band. In some cases, the uplink resource assignment may indicate a waveform type for the uplink communication. In the present example, the indicated waveform type may depend at least in part on the power headroom reported at step 615.

At step 625, UE 115-*d* may transmit an uplink transmission to base station 105-*c*. In aspects of the present example, the uplink transmission may be mapped to resources of the shared radio frequency spectrum band. In some cases, the resource mapping may be based on the waveform type indicated in the uplink resource assignment at step 620.

Figure 7:
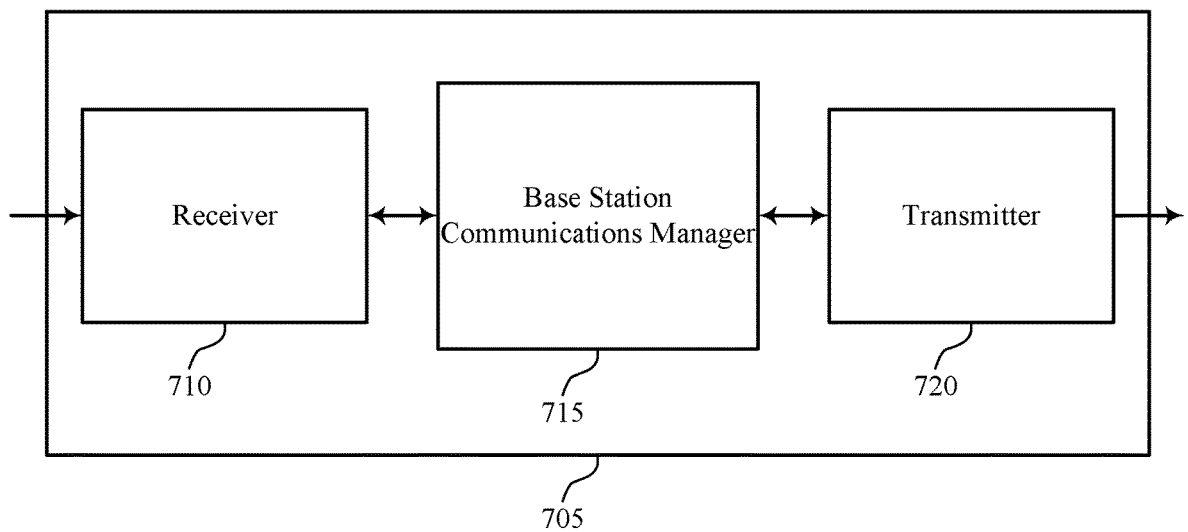
FIGS. 7 through 9 show block diagrams of a device that supports coexistence of interleaved and contiguous uplink transmissions in accordance with aspects of the present disclosure.

FIG. 7 shows a block diagram 700 of a wireless device 705 that supports coexistence of interleaved and contiguous uplink transmissions in accordance with various aspects of the present disclosure. Wireless device 705 may be an example of aspects of a base station 105 as described with reference to FIG. 1. Wireless device 705 may include receiver 710, base station manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to coexistence of interleaved and contiguous uplink transmissions, etc.). Information may be passed on to other components of the device. The receiver 710 may be an example of aspects of the transceiver 1035 described with reference to FIG. 10.

Receiver 710 may receive respective uplink transmissions from the first and second user equipment (UE)s in the uplink transmission time interval over the shared radio frequency spectrum band.

Base station manager 715 may be an example of aspects of the base station manager 1015 described with reference to FIG. 10. Base station manager 715 may receive UE capability information from a set of UEs being served by the base station over a shared radio frequency spectrum band. Further, base station manager 715 may determine, based on the UE capability information associated with the set of UEs, a logical channel allocation for the shared radio frequency spectrum band including an interlaced resource assignment bandwidth region and a contiguous resource assignment bandwidth region. Base station manager 715 may then transmit first and second uplink resource allocations for the shared radio frequency spectrum band for an uplink transmission time interval to first and second UEs, respectively. In some cases, the first uplink resource allocation may include an interlaced resource assignment in the interlaced resource assignment bandwidth region and the second uplink resource allocation may include a contiguous resource assignment in the contiguous resource assignment bandwidth region.

Transmitter 720 may transmit signals generated by other components of the device. In some examples, the transmitter 720 may be collocated with a receiver 710 in a transceiver module. For example, the transmitter 720 may be an example of aspects of the transceiver 1035 described with reference to FIG. 10. The transmitter 720 may include a single antenna, or it may include a set of antennas.

Figure 8:
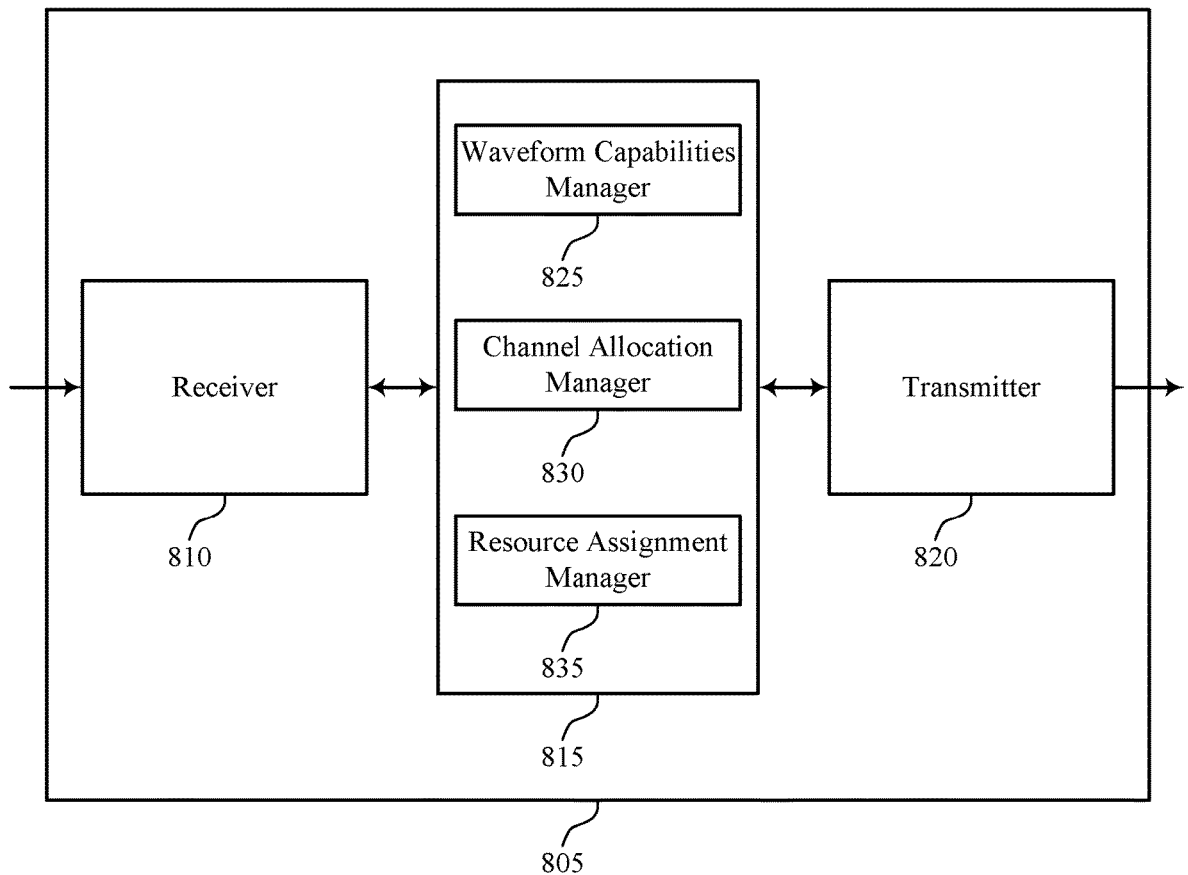

FIG. 8 shows a block diagram 800 of a wireless device 805 that supports coexistence of interleaved and contiguous uplink transmissions in accordance with various aspects of the present disclosure. Wireless device 805 may be an example of aspects of a wireless device 705 or a base station 105 as described with reference to FIGS. 1 and 7. Wireless device 805 may include receiver 810, base station manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to coexistence of interleaved and contiguous uplink transmissions, etc.). Information may be passed on to other components of the device. The receiver 810 may be an example of aspects of the transceiver 1035 described with reference to FIG. 10.

Base station manager 815 may be an example of aspects of the base station manager 1015 described with reference to FIG. 10. Base station manager 815 may also include waveform capabilities manager 825, channel allocation manager 830, and resource assignment manager 835.

Waveform capabilities manager 825 may receive UE capability information from a set of UEs being served by the base station over a shared radio frequency spectrum band. In some cases, the UE capability information includes an interleaved waveform support indicator, a contiguous waveform support indicator, a coverage enhancement indicator, a bandwidth support indicator, or combinations thereof.

Channel allocation manager 830 may determine, based on the UE capability information associated with the set of UEs, a logical channel allocation for the shared radio frequency spectrum band including an interlaced resource assignment bandwidth region and a contiguous resource assignment bandwidth region. In some cases, the logical channel allocation includes at least one narrow band resource assignment region.

Resource assignment manager 835 may transmit first and second uplink resource allocations for the shared radio frequency spectrum band for an uplink transmission time interval to first and second UEs, respectively. The first uplink resource allocation may include an interlaced resource assignment in the interlaced resource assignment bandwidth region and the second uplink resource allocation may include a contiguous resource assignment in the contiguous resource assignment bandwidth region. Further, resource assignment manager 835 may select the interlaced resource assignment for the first UE based on the power headroom for the first UE. In some cases, the first uplink resource allocation indicates a bandwidth of the interlaced resource assignment bandwidth region.

Transmitter 820 may transmit signals generated by other components of the device. In some examples, the transmitter 820 may be collocated with a receiver 810 in a transceiver module. For example, the transmitter 820 may be an example of aspects of the transceiver 1035 described with reference to FIG. 10. The transmitter 820 may include a single antenna, or it may include a set of antennas.

Figure 9:
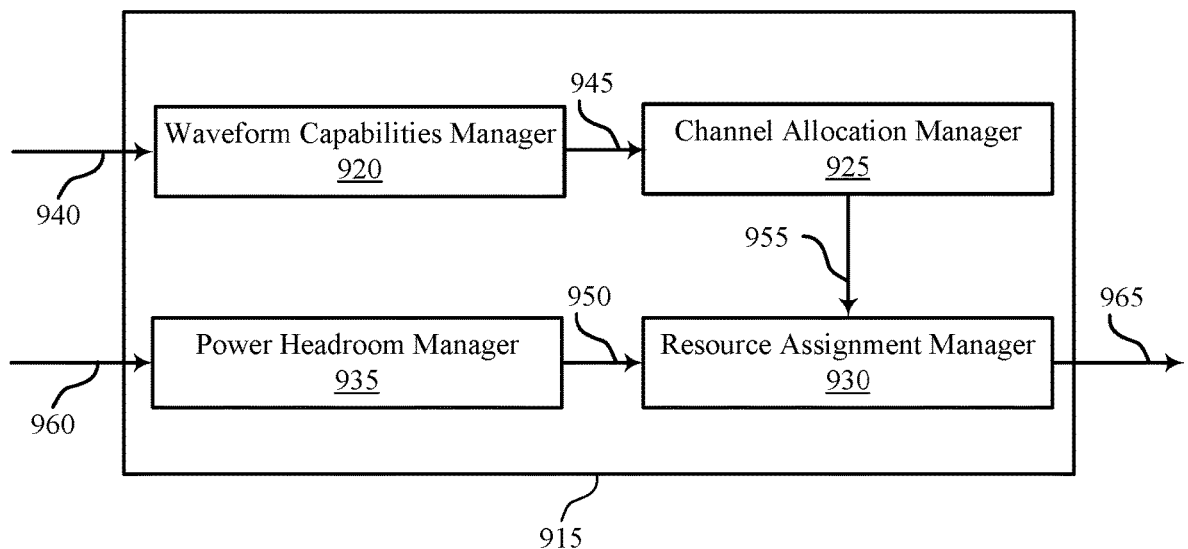

FIG. 9 shows a block diagram 900 of a base station manager 915 that supports coexistence of interleaved and contiguous uplink transmissions in accordance with various aspects of the present disclosure. The base station manager 915 may be an example of aspects of a base station manager 715, a base station manager 815, or a base station manager 1015 described with reference to FIGS. 7, 8, and 10. The base station manager 915 may include waveform capabilities manager 920, channel allocation manager 925, resource assignment manager 930, and power headroom manager 935. In some cases, each of these modules may communicate, directly or indirectly, with one another (e.g., via one or more buses or links). Further, the base station manager 915 may communicate, directly or indirectly, with a receiver and a transmitter as shown in FIG. 7.

Waveform capabilities manager 920 may receive UE capability information 940 from a set of UEs being served by the base station over a shared radio frequency spectrum band. For example, UE capability information 940 may include information such as an interleaved waveform support indicator, a contiguous waveform support indicator, a coverage enhancement indicator, a bandwidth support indicator, etc. In some cases, UE capability information 940 may be passed to waveform capabilities manager 920 via a receiver of the base station. For example, UE capability information 940 (e.g., transmitted or indicated by a UE) may be received by a base station receiver. The UE capability information 940 may then be passed from the receiver to the base station manager 915 or to the waveform capabilities manager 920. In some cases, waveform capabilities manager 920 may manage UE capability information 940 associated with multiple UEs.

The waveform capabilities manager 920 may then pass capabilities information 945 to channel allocation manager 925. Channel allocation manager 925 may determine, based on the UE capability information associated with the set of UEs, a logical channel allocation for the shared radio frequency spectrum band including an interlaced resource assignment bandwidth region and a contiguous resource assignment bandwidth region. In some cases, the logical channel allocation includes at least one narrow band resource assignment region.

Power headroom manager 935 may identify a power headroom for the first UE. In some cases, the power headroom includes a metric of power headroom over a frequency range. In some examples, power headroom manager 935 may receive power headroom information 960, relating to the first UE (e.g., via a PHR). In some cases, Power headroom manager 935 may receive power headroom information 960 via a receiver of the base station. For example, power headroom information 960 (e.g., a PHR transmitted or indicated by a UE) may be received by a base station receiver. The power headroom information 960 may then be passed from the receiver to the base station manager 915 or to the power headroom manager 935. In some cases, power headroom manager 935 may manage UE power headroom information 960 from multiple UEs.

Information from channel allocation manager 925 and/or power headroom manager 935 may then be passed to resource assignment manager 930. For example, channel allocation manager 925 may pass allocation information 955 (e.g., such as logical channel allocations, interlace patterns, etc.) to resource assignment manager 930, and power headroom manager 935 may pass information such as power headroom information 950 for one or more UEs to resource assignment manager 930. Resource assignment manager 930 may transmit first and second uplink resource allocations for the shared radio frequency spectrum band for an uplink transmission time interval to first and second UEs, respectively (e.g., according to received allocation information 955 and/or power headroom information 950). For example, resource assignment manager 930 may pass allocation information 955 (e.g., information relating to first and second uplink resource allocations) via a transmitter. The first uplink resource allocation may include an interlaced resource assignment in the interlaced resource assignment bandwidth region and the second uplink resource allocation may include a contiguous resource assignment in the contiguous resource assignment bandwidth region (e.g., based on channel allocation manager 925 received from channel allocation manager 925). Resource assignment manager 930 may then select the interlaced resource assignment for the first UE based on the power headroom for the first UE (e.g., based on power headroom information 950 received from power headroom manager 935). In some cases, the first uplink resource allocation indicates a bandwidth of the interlaced resource assignment bandwidth region. Resource assignment manager 930 may pass uplink resource allocation information 965 to other components of the base station, such as to a transmitter for transmission to a UE.

Figure 10:
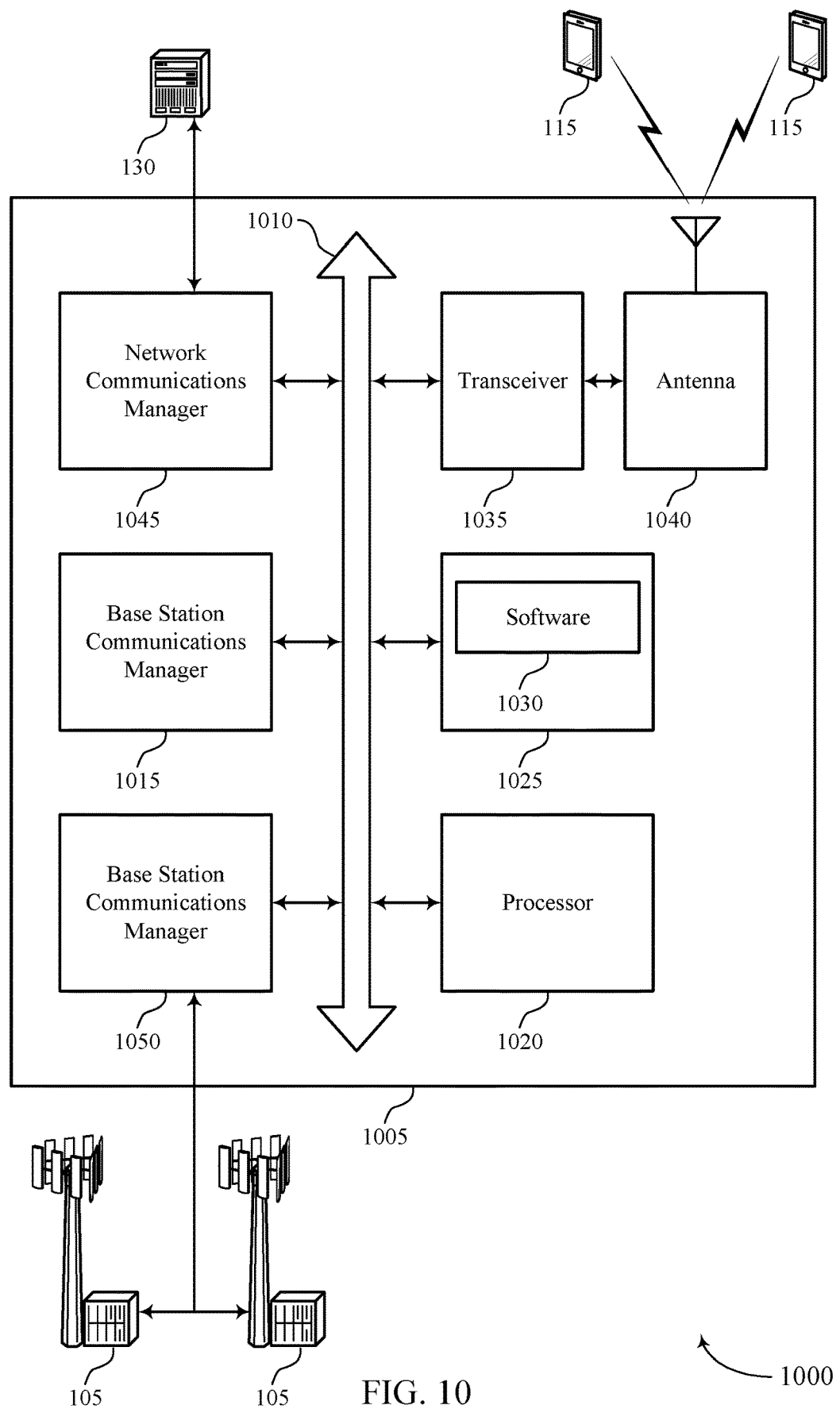
FIG. 10 illustrates a block diagram of a system including a base station that supports coexistence of interleaved and contiguous uplink transmissions in accordance with aspects of the present disclosure.

FIG. 10 shows a diagram of a system 1000 including a device 1005 that supports coexistence of interleaved and contiguous uplink transmissions in accordance with various aspects of the present disclosure. Device 1005 may be an example of or include the components of wireless device 705, wireless device 805, or a base station 105 as described above, e.g., with reference to FIGS. 1, 7 and 8. Device 1005 may include components for bi-directional voice and data communications including components for transmitting and receiving communications, including base station manager 1015, processor 1020, memory 1025, software 1030, transceiver 1035, antenna 1040, network communications manager 1045, and base station communications manager 1050. These components may be in electronic communication via one or more busses (e.g., bus 1010). Device 1005 may communicate wirelessly with one or more UEs 115.

Base station manager 1015 may manage communications with other base station 105, and may include a controller or scheduler for controlling communications with UEs 115 in cooperation with other base stations 105. For example, the base station manager 1015 may coordinate scheduling for transmissions to UEs 115 for various interference mitigation techniques such as beamforming or joint transmission. In some examples, base station manager 1015 may provide an X2 interface within an Long Term Evolution (LTE)/LTE-A wireless communication network technology to provide communication between base stations 105.

Processor 1020 may include an intelligent hardware device, (e.g., a general-purpose processor, a digital signal processor (DSP), a central processing unit (CPU), a microcontroller, an application-specific integrated circuit (ASIC), an field-programmable gate array (FPGA), a programmable logic device, a discrete gate or transistor logic component, a discrete hardware component, or any combination thereof).

In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting coexistence of interleaved and contiguous uplink transmissions).

Memory 1025 may include random access memory (RAM) and read only memory (ROM). The memory 1025 may store computer-readable, computer-executable software 1030 including instructions that, when executed, cause the processor to perform various functions described herein. In some cases, the memory 1025 may contain, among other things, a basic input/output system (BIOS) which may control basic hardware and/or software operation such as the interaction with peripheral components or devices.

Software 1030 may include code to implement aspects of the present disclosure, including code to support coexistence of interleaved and contiguous uplink transmissions. Software 1030 may be stored in a non-transitory computer-readable medium such as system memory or other memory. In some cases, the software 1030 may not be directly executable by the processor but may cause a computer (e.g., when compiled and executed) to perform functions described herein.

Transceiver 1035 may communicate bi-directionally, via one or more antennas, wired, or wireless links as described above. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas.

In some cases, the wireless device may include a single antenna 1040. However, in some cases the device may have more than one antenna 1040, which may be capable of concurrently transmitting or receiving multiple wireless transmissions.

Network communications manager 1045 may manage communications with the core network (e.g., via one or more wired backhaul links). For example, the network communications manager 1045 may manage the transfer of data communications for client devices, such as one or more UEs 115.

Base station communications manager 1050 may manage communications with other base station 105, and may include a controller or scheduler for controlling communications with UEs 115 in cooperation with other base stations 105. For example, the base station communications manager 1050 may coordinate scheduling for transmissions to UEs 115 for various interference mitigation techniques such as beamforming or joint transmission. In some examples, base station communications manager 1050 may provide an X2 interface within an LTE/LTE-A wireless communication network technology to provide communication between base stations 105.

Figure 11:
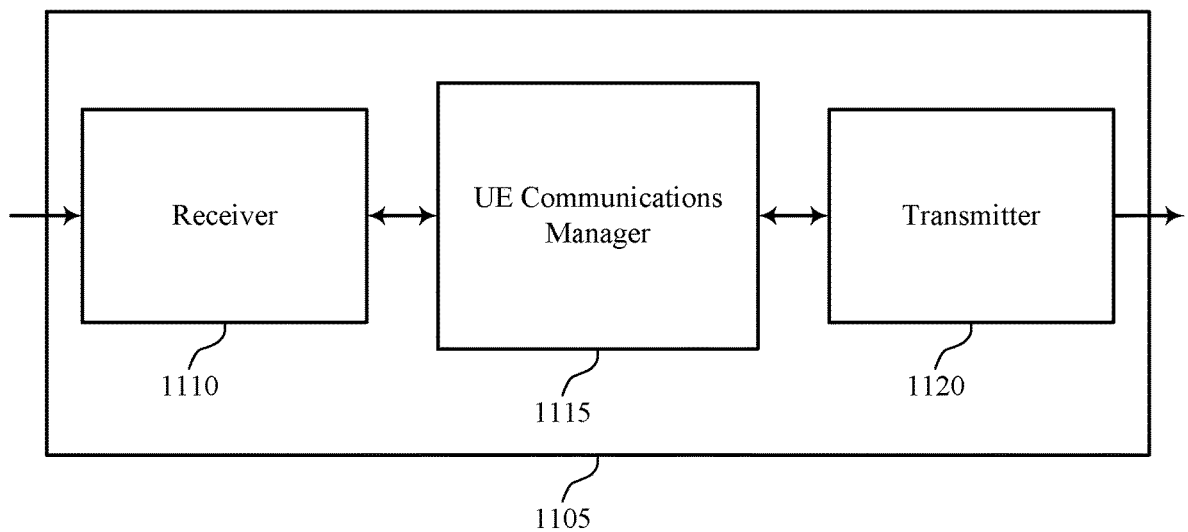
FIGS. 11 through 13 show block diagrams of a device that supports coexistence of interleaved and contiguous uplink transmissions in accordance with aspects of the present disclosure.

FIG. 11 shows a block diagram 1100 of a wireless device 1105 that supports coexistence of interleaved and contiguous uplink transmissions in accordance with various aspects of the present disclosure. Wireless device 1105 may be an example of aspects of a UE 115 as described with reference to FIG. 1. Wireless device 1105 may include receiver 1110, UE communications manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to coexistence of interleaved and contiguous uplink transmissions, etc.). Information may be passed on to other components of the device. The receiver 1110 may be an example of aspects of the transceiver 1435 described with reference to FIG. 14.

UE communications manager 1115 may be an example of aspects of the UE communications manager 1415 described with reference to FIG. 14. UE communications manager 1115 may receive a configuration from a serving base station for a shared radio frequency spectrum band and determine, for the shared radio frequency spectrum band, a first power headroom for a first uplink waveform type and a second power headroom for a second uplink waveform type. UE communications manager 1115 may report the first and second power headroom to the serving base station and receive an uplink resource assignment for the shared radio frequency spectrum band, where a waveform type for the uplink resource assignment is dependent on the reported first and second power headroom. UE communications manager 1115 may then transmit, to the serving base station, an uplink transmission mapped to resources of the shared radio frequency spectrum band based on the waveform type. The UE communications manager 1115 may also receive a configuration from a serving base station for a carrier in a shared radio frequency spectrum band, identify a waveform type indicator for at least one non-data associated uplink channel of the carrier, and transmit, to the serving base station over the carrier, an uplink transmission mapped to resources of the non-data associated uplink channel of the carrier based on the waveform type indicator. The UE communications manager 1115 may also receive a configuration from a serving base station for a carrier in a shared radio frequency spectrum band, where the configuration includes an energy detection configuration for the carrier, perform, for an uplink transmission, a LBT operation over a subset of frequency resources of the carrier according to the energy detection configuration, and transmit the uplink transmission based on a result of the LBT operation.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1435 described with reference to FIG. 14. The transmitter 1120 may include a single antenna, or it may include a set of antennas.

Figure 12:
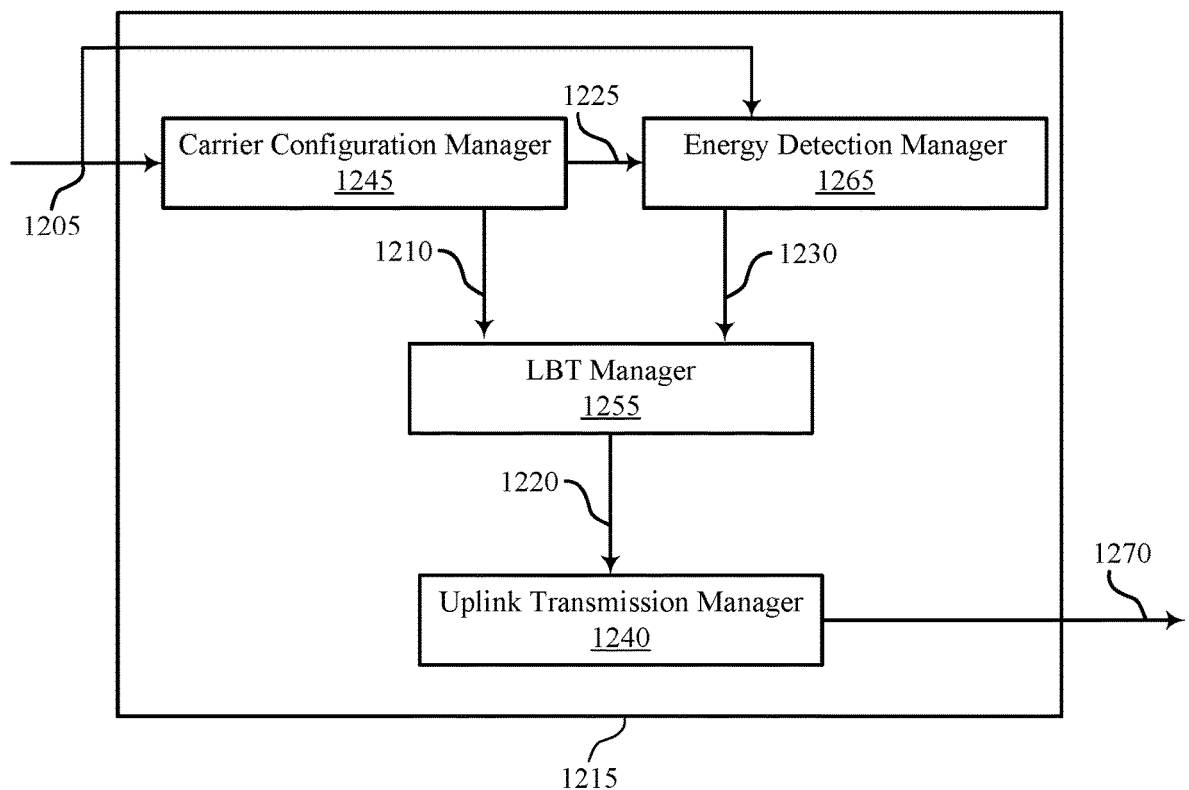

FIG. 12 shows a block diagram 1200 of a UE communications manager 1215 that supports coexistence of interleaved and contiguous uplink transmissions in accordance with various aspects of the present disclosure. The UE communications manager 1215 may be an example of aspects of a UE communications manager described with reference to FIGS. 11, 13, and 14. The UE communications manager 1215 may include carrier configuration manager 1245, energy detection manager 1265, LBT manager 1255, and uplink transmission manager 1240. In some cases, each of these modules may communicate, directly or indirectly, with one another (e.g., via one or more buses or links). Further, the UE communications manager 1215 may communicate, directly or indirectly, with a receiver and a transmitter as shown in FIG. 11.

Carrier configuration manager 1245 may receive configuration information 1205 (e.g., a configuration) from a serving base station for a carrier in a shared radio frequency spectrum band, where configuration information 1205 may include an energy detection configuration for the carrier. For example, configuration information 1205 may include frequency resources, one or more interlace patterns, etc. In some cases, the energy detection configuration may include a number of sub-bands for energy detection, a sub-band width for energy detection, a sub-band offset for energy detection, or a combination thereof.

In some cases, carrier configuration manager 1245 may pass the information relating to the configuration to energy detection manager 1265 via energy detection information 1225. Energy detection manager 1265 may interpret the configuration information and scale an energy detection level for performing the LBT operation based on the energy detection configuration information (e.g., energy detection information 1225) received from carrier configuration manager 1245. In some cases, energy detection manager 1265 may receive directly receive configuration information 1205 (e.g., which may include energy detection information 1225) via a receiver. In some cases, the energy detection information 1225 may include an energy detection level value (e.g., transmission power), a duration for energy detection, indicated frequency resources (e.g., a waveform type or bandwidth used), an energy detection guardband (e.g., a guardband or edge frequency resources exempt from energy detection), etc. In some cases, the energy detection information may refer to an energy detection configuration, which may include a number of sub-bands for energy detection, a sub-band width for energy detection, a sub-band offset for energy detection, and/or an energy detection guardband.

Information from carrier configuration manager 1245 and/or energy detection manager 1265 may then be passed to LBT manager 1255. For example, carrier configuration manager 1245 may pass configuration information 1210 received from the serving base station to LBT manager 1255, and energy detection manager 1265 may pass energy detection information 1230 (e.g., such as scaled energy detection levels and other LBT operation information) to LBT manager 1255. LBT manager 1255 may perform, for an uplink transmission, a LBT operation over a subset of frequency resources of the carrier according to the energy detection configuration (e.g., according to the received information).

Uplink transmission manager 1240 may transmit, to the serving base station, an uplink transmission mapped to resources of the shared radio frequency spectrum band based on the waveform type and transmit, to the serving base station over the carrier, an uplink transmission mapped to resources of the non-data associated uplink channel of the carrier based on the waveform type indicator as discussed in more detail above. Uplink transmission manager 1240 may transmit the uplink transmission based on a result of the LBT operation (e.g., LBT information 1220 relating to the result of the LBT operation may be passed from LBT manager 1255 to uplink transmission manager 1240). The uplink transmission manager 1240 may pass information 1270 relating to such transmissions to, for example, a transmitter of the UE.

Figure 13:
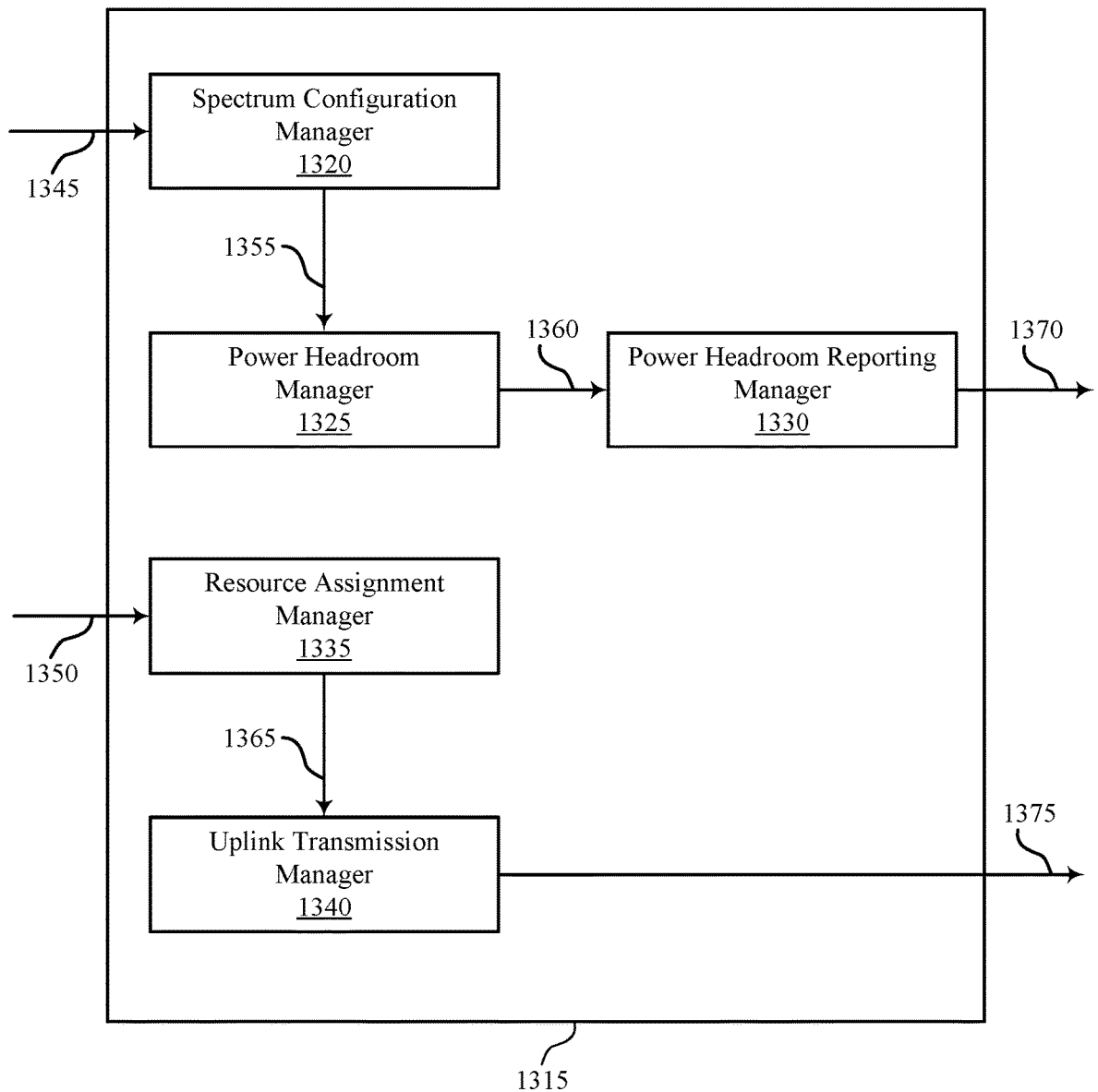

FIG. 13 shows a block diagram 1300 of a UE communications manager 1315 that supports coexistence of interleaved and contiguous uplink transmissions in accordance with various aspects of the present disclosure. The UE communications manager 1315 may be an example of aspects of a UE communications manager 1415 described with reference to FIGS. 11, 12, and 14. The UE communications manager 1315 may include spectrum configuration manager 1320, power headroom manager 1325, power headroom reporting manager 1330, resource assignment manager 1335, and uplink transmission manager 1340. In some cases, each of these modules may communicate, directly or indirectly, with one another (e.g., via one or more buses or links). Further, the UE communications manager 1315 may communicate, directly or indirectly, with a receiver and a transmitter as shown in FIG. 11.

Spectrum configuration manager 1320 may receive a configuration from a serving base station for a shared radio frequency spectrum band. For example, spectrum configuration manager 1320 may receive configuration information 1345 (e.g., frequency resources, one or more interlace patterns, etc.) from other parts of the UE such as the receiver (e.g., which may process and pass along the information received from the serving base station).

In some cases, spectrum configuration manager 1320 may pass information 1355 relating to the configuration to power headroom manager 1325. Power headroom manager 1325 may then determine, for the shared radio frequency spectrum band, a first power headroom for a first uplink waveform type and a second power headroom for a second uplink waveform type, identify a power headroom threshold associated with the waveform type indicator, and compare a power headroom for the carrier with the power headroom threshold. In some cases, the first uplink waveform type includes a contiguous waveform type and the second uplink waveform type includes an interlaced waveform type.

Power headroom manager 1325 may pass power headroom information 1360 (e.g., the first power headroom information, the second power headroom information, results of the comparison, etc.) to the power headroom reporting manager 1330. Power headroom reporting manager 1330 may report the power headroom information 1360 such as first and second power headroom to the serving base station. For example, the power headroom reporting manager 1330 may manage power headroom information 1360 received and pass the information 1370 to a transmitter in preparation for transmission to the serving base station.

Resource assignment manager 1335 may receive an uplink resource assignment 1350 for the shared radio frequency spectrum band. Uplink resource assignment 1350 may include information such as frequency resources, waveform type information, interlace patterns, time resources, etc. relating to uplink resources assigned to the wireless device. In some cases, the waveform type for the uplink resource assignment is dependent on the reported first and second power headroom (e.g., previously reported by power headroom reporting manager 1330).

Resource assignment manager 1335 may pass assignment information 1365 relating to uplink resources to uplink transmission manager 1340. Uplink transmission manager 1340 may transmit, to the serving base station, an uplink transmission mapped to resources of the shared radio frequency spectrum band based on the waveform type. Further uplink transmission manager 1340 may transmit, to the serving base station over the carrier, an uplink transmission mapped to resources of the non-data associated uplink channel of the carrier based on the waveform type indicator. For example, the uplink transmission manager 1340 may manage information received from the resource assignment manager 1335 and pass the information (e.g., information 1375) to a transmitter in preparation for transmission to the serving base station. In some cases, uplink transmission manager 1340 may transmit the uplink transmission based on a result of a LBT operation, as discussed in more detail with reference to FIG. 12.

In some cases, a UE communications manager 1315 may additionally include a waveform type manager and a SRS manager. For example, a waveform type manager may identify a waveform type indicator for at least one non-data associated uplink channel of the carrier and select a waveform type for the uplink transmission based on a result of the comparison. In some cases, the at least one non-data associated uplink channel includes a physical uplink control channel, a physical random access channel, or a sounding reference signal channel. In some cases, the identifying the waveform type indicator includes receiving the waveform type indicator in a system information block broadcast over the carrier by the serving base station. A SRS manager may receive a SRS trigger from the serving base station, the SRS trigger including an indication of an SRS waveform type and transmit an SRS, the SRS mapped to resources of the shared radio frequency spectrum band based on the SRS waveform type.

Figure 14:
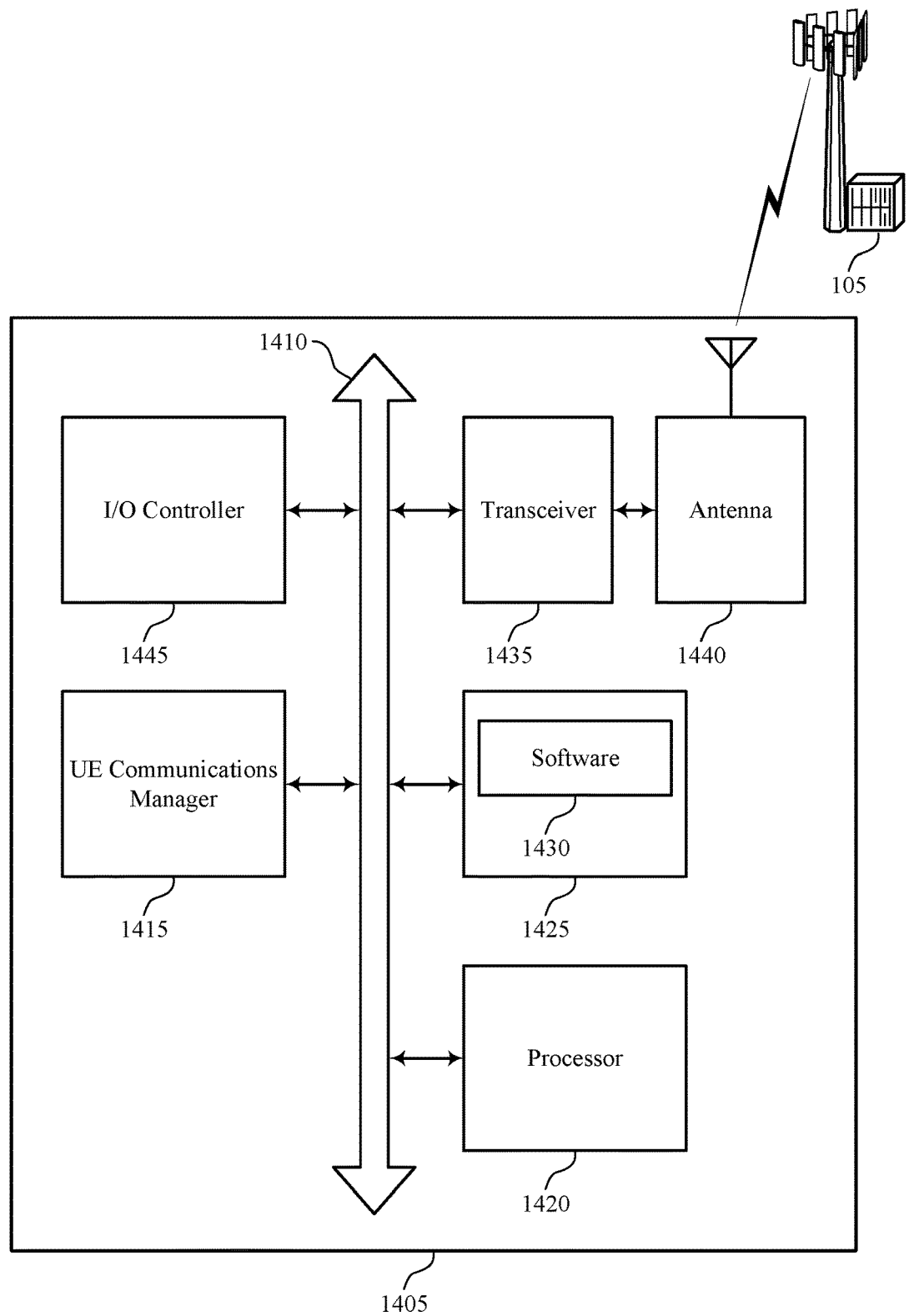
FIG. 14 illustrates a block diagram of a system including a user equipment (UE) that supports coexistence of interleaved and contiguous uplink transmissions in accordance with aspects of the present disclosure.

FIG. 14 shows a diagram of a system 1400 including a device 1405 that supports coexistence of interleaved and contiguous uplink transmissions in accordance with various aspects of the present disclosure. Device 1405 may be an example of or include the components of UE 115 as described above, e.g., with reference to FIG. 1. Device 1405 may include components for bi-directional voice and data communications including components for transmitting and receiving communications, including UE communications manager 1415, processor 1420, memory 1425, software 1430, transceiver 1435, antenna 1440, and I/O controller 1445. These components may be in electronic communication via one or more busses (e.g., bus 1410). Device 1405 may communicate wirelessly with one or more base stations 105.

Processor 1420 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1420 may be configured to operate a memory array using a memory controller. In other cases, a memory controller may be integrated into processor 1420. Processor 1420 may be configured to execute computer-readable instructions stored in a memory to perform various functions (e.g., functions or tasks supporting coexistence of interleaved and contiguous uplink transmissions).

Memory 1425 may include RAM and ROM. The memory 1425 may store computer-readable, computer-executable software 1430 including instructions that, when executed, cause the processor to perform various functions described herein. In some cases, the memory 1425 may contain, among other things, a BIOS which may control basic hardware and/or software operation such as the interaction with peripheral components or devices.

Software 1430 may include code to implement aspects of the present disclosure, including code to support coexistence of interleaved and contiguous uplink transmissions. Software 1430 may be stored in a non-transitory computer-readable medium such as system memory or other memory. In some cases, the software 1430 may not be directly executable by the processor but may cause a computer (e.g., when compiled and executed) to perform functions described herein.

Transceiver 1435 may communicate bi-directionally, via one or more antennas, wired, or wireless links as described above. For example, the transceiver 1435 may represent a wireless transceiver and may communicate bi-directionally with another wireless transceiver. The transceiver 1435 may also include a modem to modulate the packets and provide the modulated packets to the antennas for transmission, and to demodulate packets received from the antennas.

In some cases, the wireless device may include a single antenna 1440. However, in some cases the device may have more than one antenna 1440, which may be capable of concurrently transmitting or receiving multiple wireless transmissions.

I/O controller 1445 may manage input and output signals for device 1405. I/O controller 1445 may also manage peripherals not integrated into device 1405. In some cases, I/O controller 1445 may represent a physical connection or port to an external peripheral. In some cases, I/O controller 1445 may utilize an operating system such as iOS®, ANDROID®, MS-DOS®, MS-WINDOWS®, OS/2®, UNIX®, LINUX®, or another known operating system.

Figure 15:
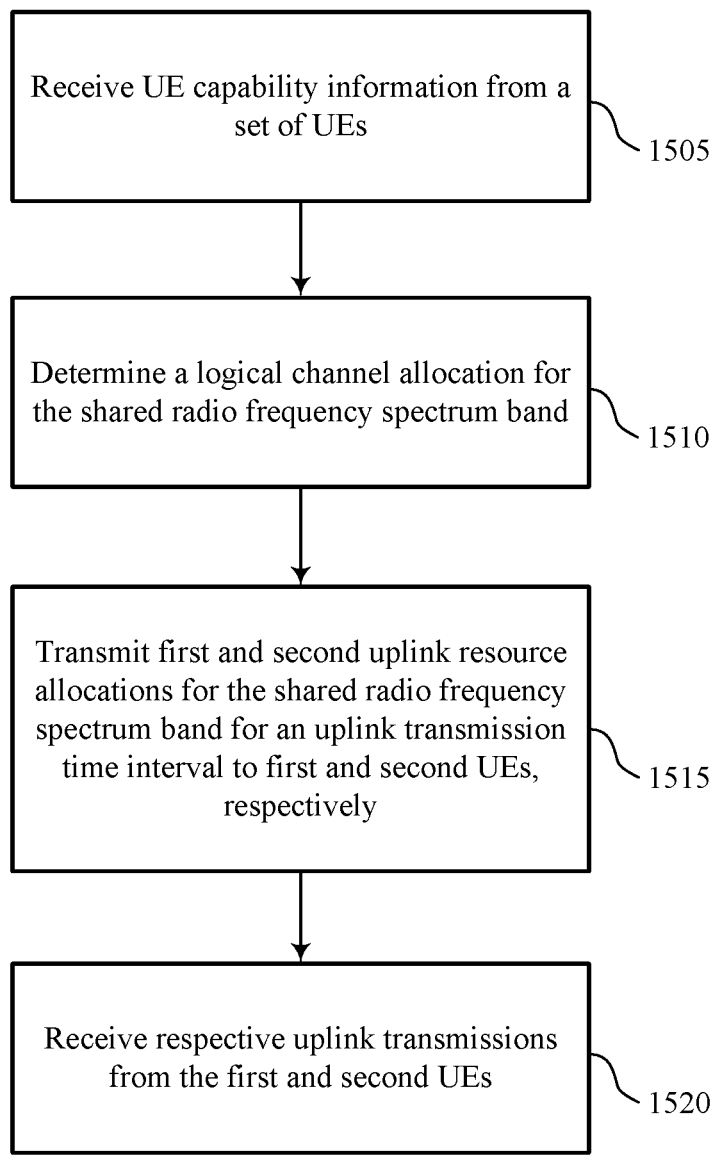
FIGS. 15 through 18 illustrate methods for coexistence of interleaved and contiguous uplink transmissions in accordance with aspects of the present disclosure.

FIG. 15 shows a flowchart illustrating a method 1500 for coexistence of interleaved and contiguous uplink transmissions in accordance with various aspects of the present disclosure. The operations of method 1500 may be implemented by a base station 105 or its components as described herein. For example, the operations of method 1500 may be performed by a base station manager as described with reference to FIGS. 7 through 10. In some examples, a base station 105 may execute a set of codes to control the functional elements of the device to perform the functions described below. Additionally or alternatively, the base station 105 may perform aspects of the functions described below using special-purpose hardware.

At block 1505 the base station 105 may receive UE capability information from a plurality of UEs being served by the base station over a shared radio frequency spectrum band. For example, the base station 105 may identify time-frequency resources over which the capability information is transmitted from the one or more UEs. The base station 105 may demodulate the transmission over those time-frequency resources and decode the demodulated transmission to obtain bits that indicate the capabilities of the one or more UEs. The operations of block 1505 may be performed according to the methods described with reference to FIGS. 1 through 6. In certain examples, aspects of the operations of block 1505 may be performed by a waveform capabilities manager as described with reference to FIGS. 7 through 10.

At block 1510 the base station 105 may determine, based on the UE capability information associated with the plurality of UEs, a logical channel allocation for the shared radio frequency spectrum band comprising an interlaced resource assignment bandwidth region and a contiguous resource assignment bandwidth region. For example, the base station 105 may manage (e.g., organize or structure) the UE capability information obtained at block 1505, and may determine a logical channel allocation based on the compiled information. The logical channel allocation may therefore be determined to accommodate the capabilities of the one or more UEs served, such that the UEs received an allocation of resources complimentary to their capabilities. The operations of block 1510 may be performed according to the methods described with reference to FIGS. 1 through 6. In certain examples, aspects of the operations of block 1510 may be performed by a channel allocation manager as described with reference to FIGS. 7 through 10.

At block 1515 the base station 105 may transmit first and second uplink resource allocations for the shared radio frequency spectrum band for an uplink transmission time interval to first and second UEs, respectively, the first uplink resource allocation comprising an interlaced resource assignment in the interlaced resource assignment bandwidth region and the second uplink resource allocation comprising a contiguous resource assignment in the contiguous resource assignment bandwidth region. For example, the base station 105 may convey the uplink resource allocations to each served UE via control channel transmissions. The base station may encode bits that indicate the resource allocations, identify time-frequency resources over which the control channel is to be transmitted, and modulate the transmission over those time-frequency resources. The operations of block 1515 may be performed according to the methods described with reference to FIGS. 1 through 6. In certain examples, aspects of the operations of block 1515 may be performed by a resource assignment manager as described with reference to FIGS. 7 through 10.

At block 1520 the base station 105 may receive respective uplink transmissions from the first and second UEs in the uplink transmission time interval over the shared radio frequency spectrum band. For example, the base station 105 may identify time-frequency resources over which uplink transmissions are transmitted from the one or more UEs. The base station 105 may demodulate the transmissions over those time-frequency resources and decode the demodulated transmissions to obtain bits that indicate the information of the transmission from the one or more UEs. The operations of block 1520 may be performed according to the methods described with reference to FIGS. 1 through 6. In certain examples, aspects of the operations of block 1520 may be performed by a receiver as described with reference to FIGS. 7 through 10.

Figure 16:
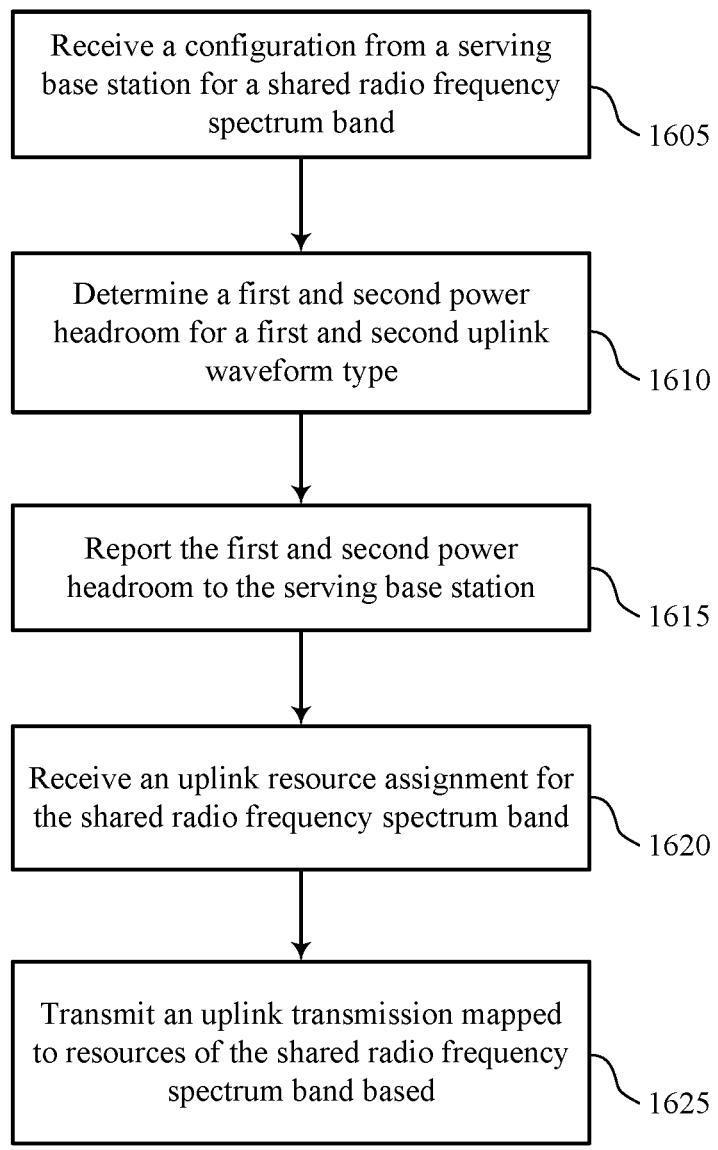

FIG. 16 shows a flowchart illustrating a method 1600 for coexistence of interleaved and contiguous uplink transmissions in accordance with various aspects of the present disclosure. The operations of method 1600 may be implemented by a UE 115 or its components as described herein. For example, the operations of method 1600 may be performed by a UE communications manager as described with reference to FIGS. 11 through 14. In some examples, a UE 115 may execute a set of codes to control the functional elements of the device to perform the functions described below. Additionally or alternatively, the UE 115 may perform aspects of the functions described below using special-purpose hardware.

At block 1605 the UE 115 may receive a configuration from a serving base station for a shared radio frequency spectrum band. For example, the UE 115 may identify time-frequency resources over which the configuration is transmitted from the serving base station. The UE 115 may demodulate the transmission over those time-frequency resources and decode the demodulated transmission to obtain bits that indicate the configuration for the shared radio frequency spectrum band. The operations of block 1605 may be performed according to the methods described with reference to FIGS. 1 through 6. In certain examples, aspects of the operations of block 1605 may be performed by a spectrum configuration manager as described with reference to FIGS. 11 through 14.

At block 1610 the UE 115 may determine, for the shared radio frequency spectrum band, a first power headroom for a first uplink waveform type and a second power headroom for a second uplink waveform type. For example, the UE 115 may interpret the configuration information obtained at block 1605 and identify power headroom information for different waveform types. The UE 115 may identify a waveform type and, based on the configured resources of the shared radio frequency spectrum band and PSD limitations, determine power headroom. The operations of block 1610 may be performed according to the methods described with reference to FIGS. 1 through 6. In certain examples, aspects of the operations of block 1610 may be performed by a power headroom manager as described with reference to FIGS. 11 through 14.

At block 1615 the UE 115 may report the first and second power headroom to the serving base station. For example, the UE 115 use power headroom information determined at block 1610 and generate a PHR. A PHR may include power headroom information for the first power headroom and/or the second power headroom, and may be transmitted or reported to the base station. The operations of block 1615 may be performed according to the methods described with reference to FIGS. 1 through 6. In certain examples, aspects of the operations of block 1615 may be performed by a power headroom reporting manager as described with reference to FIGS. 11 through 14.

At block 1620 the UE 115 may receive an uplink resource assignment for the shared radio frequency spectrum band, wherein a waveform type for the uplink resource assignment is dependent on the reported first and second power headroom. For example, the UE 115 may identify time-frequency resources over which the uplink resource assignment is transmitted from the serving base station. The UE 115 may demodulate the transmission over those time-frequency resources and decode the demodulated transmission to obtain bits that indicate the uplink resources assigned within the shared radio frequency spectrum band. The operations of block 1620 may be performed according to the methods described with reference to FIGS. 1 through 6. In certain examples, aspects of the operations of block 1620 may be performed by a resource assignment manager as described with reference to FIGS. 11 through 14.

At block 1625 the UE 115 may transmit, to the serving base station, an uplink transmission mapped to resources of the shared radio frequency spectrum band based at least in part on the waveform type. The UE 115 may encode bits that indicate the transmission, identify time-frequency resources over which the transmission is to be mapped to for transmission, and modulate the transmission over those time-frequency resources. The time-frequency resources may be identified based on the uplink resource assignment received at block 1620. The operations of block 1625 may be performed according to the methods described with reference to FIGS. 1 through 6. In certain examples, aspects of the operations of block 1625 may be performed by a uplink transmission manager as described with reference to FIGS. 11 through 14.

Figure 17:
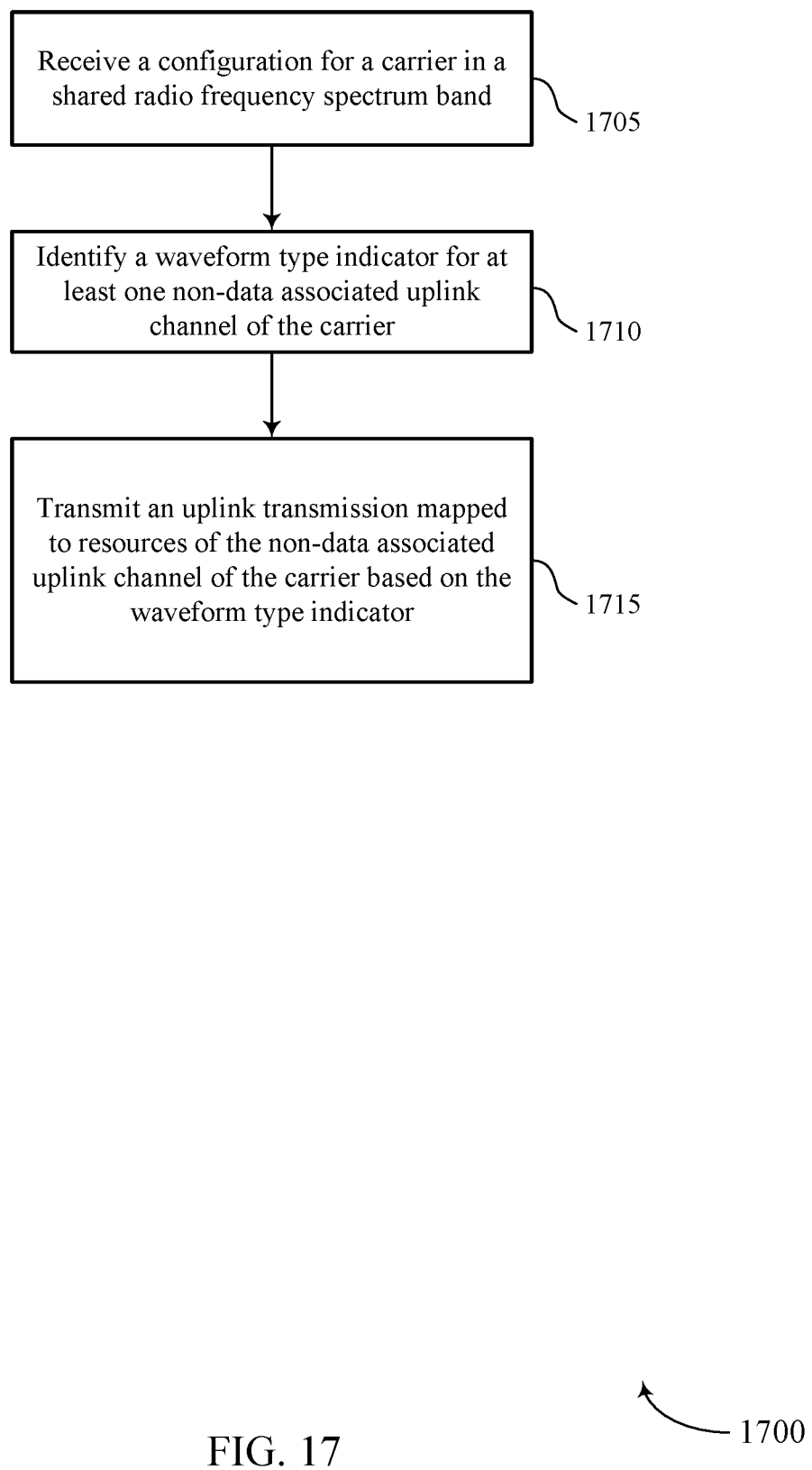

FIG. 17 shows a flowchart illustrating a method 1700 for coexistence of interleaved and contiguous uplink transmissions in accordance with various aspects of the present disclosure. The operations of method 1700 may be implemented by a UE 115 or its components as described herein. For example, the operations of method 1700 may be performed by a UE communications manager as described with reference to FIGS. 11 through 14. In some examples, a UE 115 may execute a set of codes to control the functional elements of the device to perform the functions described below. Additionally or alternatively, the UE 115 may perform aspects of the functions described below using special-purpose hardware.

At block 1705 the UE 115 may receive a configuration from a serving base station for a carrier in a shared radio frequency spectrum band. For example, the UE 115 may identify time-frequency resources over which the configuration is transmitted from the serving base station. The UE 115 may demodulate the transmission over those time-frequency resources and decode the demodulated transmission to obtain bits that indicate the configuration for the carrier in the shared radio frequency spectrum band. The operations of block 1705 may be performed according to the methods described with reference to FIGS. 1 through 6. In certain examples, aspects of the operations of block 1705 may be performed by a carrier configuration manager as described with reference to FIGS. 11 through 14.

At block 1710 the UE 115 may identify a waveform type indicator for at least one non-data associated uplink channel of the carrier. The operations of block 1710 may be performed according to the methods described with reference to FIGS. 1 through 6. In certain examples, aspects of the operations of block 1710 may be performed by a waveform type manager as described with reference to FIGS. 11 through 14.

At block 1715 the UE 115 may transmit, to the serving base station over the carrier, an uplink transmission mapped to resources of the non-data associated uplink channel of the carrier based at least in part on the waveform type indicator. The UE 115 may encode bits that indicate the uplink transmission, identify time-frequency resources over which the uplink transmission is to be mapped to for transmission, and modulate the transmission over those time-frequency resources. The time-frequency resources may be identified based on the configuration received at block 1705. The operations of block 1715 may be performed according to the methods described with reference to FIGS. 1 through 6. In certain examples, aspects of the operations of block 1715 may be performed by a uplink transmission manager as described with reference to FIGS. 11 through 14.

Figure 18:
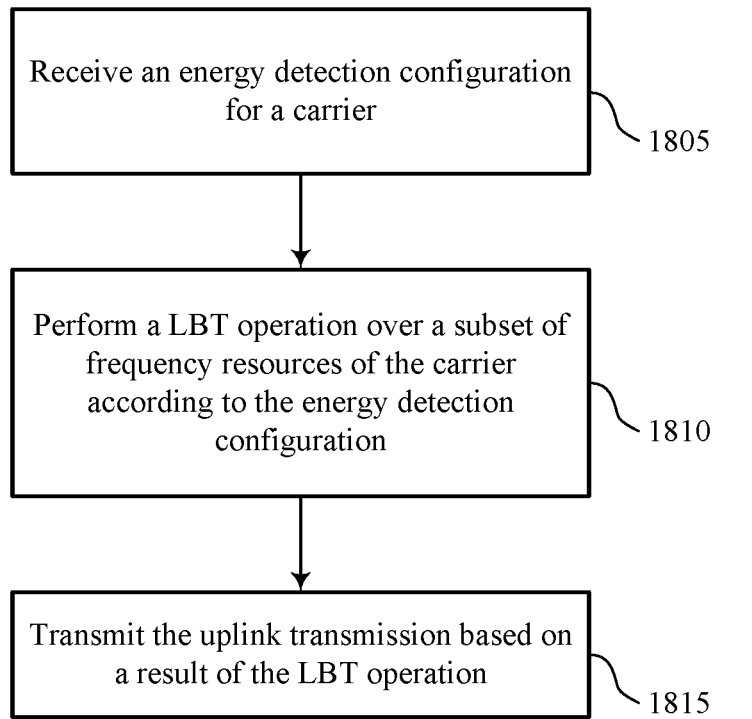

FIG. 18 shows a flowchart illustrating a method 1800 for coexistence of interleaved and contiguous uplink transmissions in accordance with various aspects of the present disclosure. The operations of method 1800 may be implemented by a UE 115 or its components as described herein. For example, the operations of method 1800 may be performed by a UE communications manager as described with reference to FIGS. 11 through 14. In some examples, a UE 115 may execute a set of codes to control the functional elements of the device to perform the functions described below. Additionally or alternatively, the UE 115 may perform aspects of the functions described below using special-purpose hardware.

At block 1805 the UE 115 may receive a configuration from a serving base station for a carrier in a shared radio frequency spectrum band, wherein the configuration comprises an energy detection configuration for the carrier. For example, the UE 115 may identify time-frequency resources over which the configuration is transmitted. The UE 115 may then demodulate the transmission over those time-frequency resources and decode the demodulated transmission to obtain bits that indicate the configuration transmitted by the serving base station. In some cases, the obtained bits may indicate the energy detection configuration. The operations of block 1805 may be performed according to the methods described with reference to FIGS. 1 through 6. In certain examples, aspects of the operations of block 1805 may be performed by a carrier configuration manager as described with reference to FIGS. 11 through 14.

At block 1810 the UE 115 may perform, for an uplink transmission, a LBT operation over a subset of frequency resources of the carrier according to the energy detection configuration. For example the UE may perform a LBT operation on certain sub-bands over certain sub-band widths according to some sub-band offsets, according to the parameters conveyed in the energy detection configuration. The operations of block 1810 may be performed according to the methods described with reference to FIGS. 1 through 6. In certain examples, aspects of the operations of block 1810 may be performed by a LBT manager as described with reference to FIGS. 11 through 14.

At block 1815 the UE 115 may transmit the uplink transmission based on a result of the LBT operation. For example, if the LBT has passed or is successful, the UE 115 may proceed with uplink transmission. The UE 115 may encode bits that indicate the transmission, identify time-frequency resources over which the transmission is to be mapped to for transmission, and modulate the transmission over those time-frequency resources. The operations of block 1815 may be performed according to the methods described with reference to FIGS. 1 through 6. In certain examples, aspects of the operations of block 1815 may be performed by a uplink transmission manager as described with reference to FIGS. 11 through 14.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM).

An orthogonal frequency division multiple access (OFDMA) system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are releases of Universal Mobile Telecommunications System (UMTS) that use E-UTRA. UTRA, E-UTRA, UMTS, LTE, LTE-A, NR, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of evolved node B (eNBs) provide coverage for various geographical regions. For example, each eNB, gNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), next generation NodeB (gNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving a configuration from a serving base station for a carrier in a shared radio frequency spectrum band, wherein the configuration comprises an energy detection configuration for the carrier that indicates whether a waveform type of an uplink transmission comprises a contiguous waveform type or an interlaced waveform type;
   performing, for the uplink transmission, a listen-before-talk operation over a subset of frequency resources of the carrier according to the energy detection configuration based at least in part on the energy detection configuration indicating whether the waveform type comprises the contiguous waveform type or the interlaced waveform type; and
   transmitting the uplink transmission based on a result of the listen-before-talk operation.

2. The method of claim 1, wherein the energy detection configuration comprises a number of sub-bands for energy detection, a sub-band width for energy detection, a sub-band offset for energy detection, an energy detection guardband, or a combination thereof.

3. The method of claim 1, further comprising:
scaling an energy detection level for performing the listen-before-talk operation based at least in part on the energy detection configuration.

4. The method of claim 1, wherein the received configuration is based at least in part on the waveform type supported by the UE.

5. The method of claim 1, wherein the listen-before-talk operation is performed over an entire bandwidth of the carrier.

6. The method of claim 1, wherein the listen-before-talk operation is performed based at least in part on the waveform type, a bandwidth, a transmission power, or a combination thereof.

7. The method of claim 1, wherein the energy detection configuration further comprises an energy detection threshold.

8. An apparatus for wireless communication, in a system comprising:
a processor;
memory in electronic communication with the processor; and
instructions stored in the memory and operable, when executed by the processor, to cause the apparatus to:
receive a configuration from a serving base station for a carrier in a shared radio frequency spectrum band, wherein the configuration comprises an energy detection configuration for the carrier that indicates whether a waveform type of an uplink transmission comprises a contiguous waveform type or an interlaced waveform type;
perform, for the uplink transmission, a listen-before-talk operation over a subset of frequency resources of the carrier according to the energy detection configuration based at least in part on the energy detection configuration indicating whether the waveform type comprises the contiguous waveform type or the interlaced waveform type; and
transmit the uplink transmission based on a result of the listen-before-talk operation.

9. The apparatus of claim 8, wherein the energy detection configuration comprises a number of sub-bands for energy detection, a sub-band width for energy detection, a sub-band offset for energy detection, an energy detection guardband, or a combination thereof.

10. The apparatus of claim 8, wherein the instructions are further executable by the processor to cause the apparatus to:
scale an energy detection level for performing the listen-before-talk operation based at least in part on the energy detection configuration.

11. The apparatus of claim 8, wherein the received configuration is based at least in part on the waveform type supported by the UE.

12. The apparatus of claim 8, wherein the listen-before-talk operation is performed over an entire bandwidth of the carrier.

13. The apparatus of claim 8, wherein the listen-before-talk operation is performed based at least in part on the waveform type, a bandwidth, a transmission power, or a combination thereof.

14. An apparatus for wireless communication at a user equipment (UE), comprising:
means for receiving a configuration from a serving base station for a carrier in a shared radio frequency spectrum band, wherein the configuration comprises an energy detection configuration for the carrier that indicates whether a waveform type of an uplink transmission comprises a contiguous waveform type or an interlaced waveform type;
means for performing, for the uplink transmission, a listen-before-talk operation over a subset of frequency resources of the carrier according to the energy detection configuration based at least in part on the energy detection configuration indicating whether the waveform type comprises the contiguous waveform type or the interlaced waveform type; and
means for transmitting the uplink transmission based on a result of the listen-before-talk operation.

15. The apparatus of claim 14, wherein the energy detection configuration comprises a number of sub-bands for energy detection, a sub-band width for energy detection, a sub-band offset for energy detection, an energy detection guardband, or a combination thereof.

16. The apparatus of claim 14, further comprising:
means for scaling an energy detection level for performing the listen-before-talk operation based at least in part on the energy detection configuration.

17. The apparatus of claim 14, wherein the received configuration is based at least in part on the waveform type supported by the UE.

18. The apparatus of claim 14, wherein the listen-before-talk operation is performed over an entire bandwidth of the carrier.

19. The apparatus of claim 14, wherein the listen-before-talk operation is performed based at least in part on the waveform type, a bandwidth, a transmission power, or a combination thereof.

20. A non-transitory computer-readable medium storing code for wireless communication at a user equipment (UE), the code comprising instructions executable by a processor to:
receive a configuration from a serving base station for a carrier in a shared radio frequency spectrum band, wherein the configuration comprises an energy detection configuration for the carrier that indicates whether a waveform type of an uplink transmission comprises a contiguous waveform type or an interlaced waveform type;
perform, for the uplink transmission, a listen-before-talk operation over a subset of frequency resources of the carrier according to the energy detection configuration based at least in part on the energy detection configuration indicating whether the waveform type comprises the contiguous waveform type or the interlaced waveform type; and
transmit the uplink transmission based on a result of the listen-before-talk operation.

* * * * *